United States Patent
Cornell

(10) Patent No.: US 12,309,297 B2
(45) Date of Patent: May 20, 2025

(54) ENCRYPTED RESPONSE TIMING FOR PRESENCE DETECTION

(71) Applicant: Google LLC, Mountain View, CA (US)

(72) Inventor: Brian Clinton Cornell, Kenmore, WA (US)

(73) Assignee: GOOGLE LLC, Mountain View, CA (US)

( * ) Notice: Subject to any disclaimer, the term of this patent is extended or adjusted under 35 U.S.C. 154(b) by 177 days.

(21) Appl. No.: 18/040,902

(22) PCT Filed: Aug. 3, 2021

(86) PCT No.: PCT/US2021/044337
§ 371 (c)(1),
(2) Date: Feb. 7, 2023

(87) PCT Pub. No.: WO2022/031699
PCT Pub. Date: Feb. 10, 2022

(65) Prior Publication Data
US 2023/0308298 A1  Sep. 28, 2023

Related U.S. Application Data

(60) Provisional application No. 63/062,513, filed on Aug. 7, 2020.

(51) Int. Cl.
*H04L 9/32* (2006.01)
*H04L 9/40* (2022.01)

(52) U.S. Cl.
CPC .......... *H04L 9/3271* (2013.01); *H04L 63/126* (2013.01)

(58) Field of Classification Search
None
See application file for complete search history.

(56) References Cited

U.S. PATENT DOCUMENTS 10,521,984 B1 * 12/2019 Johansson ............. H04L 63/108
2006/0294362 A1  12/2006 Epstein
(Continued)

FOREIGN PATENT DOCUMENTS

WO  WO 2014/141024  9/2014

OTHER PUBLICATIONS

International Preliminary Report on Patentability for Application No. PCT/US2021/044337, mailed Feb. 16, 2023, 11 pages.
(Continued)

*Primary Examiner* — Benjamin E Lanier
(74) *Attorney, Agent, or Firm* — DORITY & MANNING P.A.

(57) ABSTRACT

A computer-implemented method for verifying identity of an asset can include transmitting, by a first asset, a challenge message at a challenge message transmit time. The challenge message can include a challenge response delay. The method can include receiving, by the first asset, a reply message at a reply message receive time. The reply message can be transmitted from a second asset that is in receipt of the challenge message. The method can include verifying, by the first asset, the second asset based on a comparison of the reply message receive time to a valid reply message receive time span that is based at least in part on the challenge message transmit time and the challenge response delay.

19 Claims, 7 Drawing Sheets

(56) References Cited

U.S. PATENT DOCUMENTS

| | | | |
|---|---|---|---|
| 2007/0300070 A1 | 12/2007 | Shen-Orr et al. | |
| 2015/0318998 A1* | 11/2015 | Erlikhman | H04L 63/0853 |
| | | | 713/171 |
| 2016/0352605 A1* | 12/2016 | O'Donoghue | H04L 9/0838 |
| 2021/0350639 A1* | 11/2021 | Sabripour | H04L 63/0861 |

OTHER PUBLICATIONS

International Search Report for Application No. PCT/US2021/044337, mailed on Oct. 15, 2021, 3 pages.

\* cited by examiner

ENCRYPTED RESPONSE TIMING FOR PRESENCE DETECTION

PRIORITY CLAIM

The present application is based upon and claims the right of priority under 35 U.S.C. § 371 to International Application No. PCT/US2021/044337 filed on Aug. 3, 2021, which claims the benefit of priority of U.S. Provisional Application Ser. No. 63/062,513, titled "Encrypted Response Timing for Presence Detection," filed on Aug. 7, 2020, Applicant claims priority to and the benefit of each of such application and incorporates all such applications herein by reference in their entirety.

FIELD

The present disclosure relates generally to presence detection, such as site presence detection, geofencing, authentication, secure access, etc.

BACKGROUND

Computing systems can be used to restrict access to an asset, secure area, etc. based on an identity of a computing device. For instance, a remote computing device can be authenticated by the computing systems and allowed to interact with the computing systems once the identity of the computing device is verified. For instance, a user of the remote computing device can be granted access to a secure area and/or secure system based on a verified identity of the computing device.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for verifying identity of an asset. The computer-implemented method can include transmitting, by a first asset, a challenge message at a challenge message transmit time. The challenge message can include a challenge response delay. The computer-implemented method can include receiving, by the first asset, a reply message at a reply message receive time. The reply message can be transmitted from a second asset that is in receipt of the challenge message. The computer-implemented method can include verifying, by the first asset, the second asset based on a comparison of the reply message receive time to a valid reply message receive time span. The valid reply message receive time span can be based at least in part on the challenge message transmit time and the challenge response delay.

Another example aspect of the present disclosure is directed to a computing system configured to verify identity of a second computing system. The computing system can include one or more processors and one or more memory devices storing computer-readable instructions that, when implemented, cause the one or more processors to perform operations. The operations can include transmitting a challenge message at a challenge message transmit time to a second computing system. The challenge message can include a challenge response delay. The operations can include receiving, from the second computing system, a reply message at a reply message receive time. The operations can include verifying the second computing system based on a comparison of the reply message receive time to a valid reply message receive time span. The valid reply message receive time span can be based at least in part on the challenge message transmit time and the challenge response delay.

Another example aspect of the present disclosure is directed to a computing system configured to be verified by a second computing system. The computing system can include one or more processors and one or more memory devices storing computer-readable instructions that, when implemented, cause the one or more processors to perform operations. The operations can include obtaining a challenge message from a second computing system. The challenge message can include a challenge response delay. The operations can include obtaining the challenge response delay from the challenge message. The operations can include transmitting a reply message to the second computing system at a reply message transmit time. The reply message transmit time can be based at least in part on the challenge response delay.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
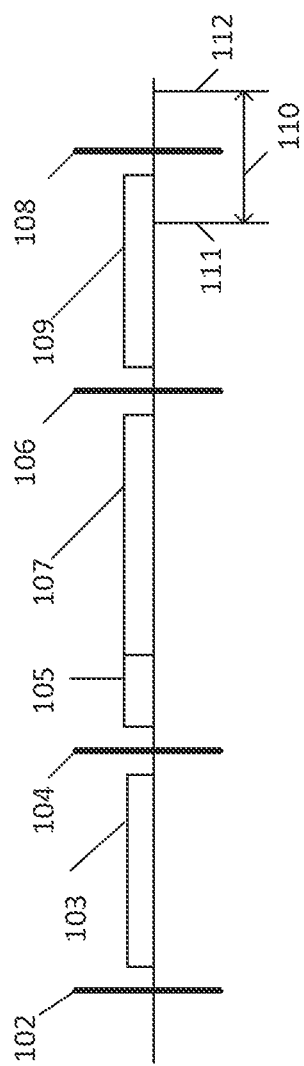
FIG. 1 depicts a timing diagram of an example method for presence detection according to example implementations of the present disclosure.

Example aspects of the present disclosure are directed to systems and methods for presence detection. Presence detection can include the capability of a mobile device (e.g., an employee badge) to detect whether it is physically present at a trusted site, among trusted devices, etc. In some cases, authentication (e.g., verifying identity of the site and/or mobile device) can be a related objective of site presence detection.

For example, site presence detection can be useful to provide that a device only transmits secure information when it is guaranteed to be "on-site" and/or otherwise in communication with a trusted and/or verified recipient. For example, it may be desirable that an employee badge transmitting a secure identity does not transmit that identity when not on a secure site. As another example, it may be desirable to restrict access to areas, computing systems, etc. to individuals and/or other systems that are in possession of a genuine security badge, asset, token, etc. Additionally, reducing secure transmissions from the device when not on-site can, in some cases, lead to power savings (e.g., battery savings).

Some existing approaches to site presence detection include detecting presence of an encoded signal. However, this approach can be susceptible to replay attacks. For instance, even if an encoded signal is encrypted and/or constantly changing, the signal can be captured from a trusted site and relayed to a transmitter using the internet or a dedicated long range wireless connection. The adversarial party may not even need to be able to interpret or modify the signal. Delay caused by the relay can, in some cases, be hidden in clock drift on feasible real time clocks for mobile devices. As another example, some conditions of a site can be spoofed (e.g., presence of signals, etc.) to bypass some other existing approaches.

Example aspects of the present disclosure can provide systems and methods that overcome these and other problems. According to example aspects of the present disclosure, a first asset and/or a second asset can be configured for presence detection. For instance, in some implementations, one or both of the first asset and/or the second asset can verify the other of or both of the first asset and/or the second asset. For instance, verifying can be or can include detecting presence of a challenging asset (e.g., the first asset and/or the second asset), such as detecting that a challenging asset is within a proximity of another asset. As another example, verifying can be or can include authenticating an identity of a challenging asset, such as authenticating, by one or more trusted assets (e.g., one of the first asset or the second asset), that the identity of the challenging asset (e.g., the other of the first asset or the second asset) belongs to a trusted network to which the trusted assets additionally belong. For instance, the trusted assets can verify that the challenging asset is privy to and/or otherwise conforms to a secure transmission and/or cryptographic scheme known only to trusted assets. As another example, verifying can be or can include granting access to a secure area and/or secure resources (e.g., a secure computing system) for a challenging asset and/or a user of a challenging asset. For instance, a locked door, gate, etc. can be opened based on the verification, a computing system can initiate and/or receive transmissions based on the verification, etc.

The first asset and/or the second asset can be or can include any suitable computer systems and/or related components, such as, for example, processor(s), memory device(s), user input component(s), sensor(s), communication system(s) (e.g., antennas, receptors, transmitters, etc.), and/or any other suitable components. The first asset and/or the second asset can be or can include computing system(s), such as one or more computing device(s), such as mobile device(s) such as, for instance, cell phones, mobile phones, smartphones, tablet computers, laptop computers, handheld computers, PDAs, etc. For instance, in some implementations, the first asset and/or the second asset can be or can include server computing system(s). Additionally and/or alternatively, in some implementations, the first asset and/or the second asset can be or can include an integrated computing system, such as a dedicated computing system integrated into, for example, a security badge (e.g., employee badge), fob, clothing article, and/or any other suitable clothing, accessory, and/or paraphernalia in accordance with example aspects of the present disclosure. For instance, in some implementations, the first asset and the second asset can both be or can both include security badges. As another example, in some implementations, the first asset can be or can include a security badge and the second asset can be or can include a server computing system. For instance, the first asset and/or the second asset can be included in a network of two or more security assets having verified statuses. As one example, the first asset and/or the second asset can each include a clock configured to provide a current time.

The first asset and/or the second asset can be or can include a computing system. The computing system can include one or more processors. The computing system can include one or more memory devices. The one or more memory devices can store computer-readable instructions that, when implemented, cause the one or more processors to perform operations. For instance, the operations can include operations detected to a presence detection process, such as a portion of the presence detection process implemented at the first asset and/or the second asset. The first asset and/or the second asset can perform the presence detection process. For instance, in some implementations, the first asset can verify the second asset. As another example, in some implementations, the second asset can verify the first asset. In some implementations, both the first asset and the second asset can verify each other.

The presence detection process can include transmitting a challenge message. The challenge message can be transmitted from a first asset to a second asset. For instance, the first asset can transmit the challenge message when it is desirable for the first asset and/or the second asset to be verified. In some implementations, the challenge message can be transmitted arbitrarily (e.g., randomly), periodically (e.g., in set intervals), and/or in response to one or more stimuli (e.g., a request message, such as a message from another asset). The challenge message can include a challenge response delay. The challenge response delay can be indicative of a time duration that the second asset must wait before replying to the challenge message. Additionally and/or alternatively, the challenge response delay can include an identifier, such as a nonce. Additionally and/or alternatively, the challenge message can include a challenge message transmit time corresponding to the point in time at which the challenge message is partially and/or completely transmitted.

The challenge message can be received by the second asset. The challenge message can be received by the second asset at a challenge message receive time. For instance, the challenge message receive time can be a time (e.g., as measured by a clock of the second asset) at which the challenge message is partially and/or completely captured (e.g., by a signal receptor, antenna, etc.), recorded (e.g., in a memory device, etc.), and/or otherwise suitably present at the second asset. The presence detection process can include obtaining the challenge response delay from the challenge message. As one example, the challenge message can be encrypted. Additionally and/or alternatively, obtaining the challenge response delay can include decrypting the challenge message. Additionally and/or alternatively, obtaining the challenge response delay can include extracting the challenge response delay from a decrypted challenge message. For instance, decrypting the challenge message can include transforming an encrypted challenge message that is uninterpretable in a conventional computer format (e.g., hexadecimal, floating point, ASCII, etc.) into a decrypted challenge message that can be interpreted by the second asset.

In some implementations, the second asset can determine that the challenge message receive time is within a valid travel time interval from the challenge message transmit time. The second asset can determine that the challenge message receive time is within a valid travel time interval from the challenge message time prior to transmitting a reply message. For example, if the challenge message receive time is within the valid travel time interval, the process can proceed normally (e.g., including transmitting a reply message). For instance, in response to determining that the challenge message receive time is within a valid travel time interval from the challenge message transmit time, the process can include transmitting the reply message. If, however, the challenge message receive time is not within the valid time travel interval (e.g., if the receive time precedes the transmit time and/or if the challenge message arrives too late), the process can be aborted. For instance, in response to determining that the challenge message receive time is not within a valid travel time interval from the challenge message transmit time, the process can include aborting transmitting the reply message.

For instance, in some implementations, the challenge message can include the challenge message transmit time. The second asset can compare the challenge message receive time to the challenge message transmit time (e.g., by subtracting the challenge message receive time from the challenge message transmit time) to determine if the challenge message receive time is within the valid travel time interval from the challenge message transmit time. The valid travel time interval can be established based at least in part on travel time, such as one-directional travel time from the first asset to the second asset, and/or a maximum distance between the first asset and the second asset. For example, the valid travel time interval can include a subtractive combination of the challenge message receive time and a travel time corresponding to how long it would take a signal to travel from the first asset to the second asset at a maximum distance (e.g., if the speed at which the signal travels is known, such as at the speed of light). As another example, the valid travel time interval can be an arbitrary interval, such as a microsecond, such as less than a microsecond. In some implementations, tolerances based on, for example, clock drift, desynchronization, etc. can be included in the valid travel time interval.

The challenge response delay can specify a time duration that the second asset is to wait before responding (e.g., transmitting a response) to the challenge message. For instance, the challenge response delay can specify the time duration in such a manner that only trusted systems, such as the second asset, can understand (e.g., by encryption). Thus, an adversarial party can be prevented from knowing when to respond to the challenge message. Thus, reply messages that do not conform to the challenge response delay can have a high likelihood of sourcing from an adversarial party and/or may be discarded, blocked, and/or otherwise ignored by the first asset.

As one example, the challenge message can be encrypted by public-key cryptography. For instance, in some implementations, a public key of the first asset can be used to encrypt (e.g., by the first asset) the challenge message. Additionally and/or alternatively, in some implementations, a private key of the first asset can be used to encrypt (e.g., by the first asset) the challenge message. For instance, in some implementations, a public key of the first asset can be used to decrypt (e.g., by the second asset) the challenge message. Additionally and/or alternatively, in some implementations, a private key of the first asset can be used to decrypt (e.g., by the second asset) the challenge message.

The second asset can wait for a time duration that is specified by the challenge response delay. For example, the challenge response delay can specify a time duration to wait after some known time, such as, for example, the challenge message transmit time and/or the challenge message receive time. For example, in some implementations, the challenge response delay can specify a time duration to wait after the challenge message receive time. As another example, the challenge response delay can specify a time duration to wait after a decrypting process is complete (e.g., if the decrypting process has a known compute time).

The time duration can be specified in any suitable format in accordance with example aspects of the present disclosure. As one example, the time duration can be or can include a number of seconds, such as a fractional number of seconds (e.g., milliseconds, microseconds, etc.). As another example, the time duration can be or can include a number of clock cycles.

As used herein, "waiting" refers to allowing a time duration to lapse before a response is transmitted from a waiting asset (e.g., the second asset), and does not necessarily correspond to an idle state of the waiting asset. For example, the waiting asset may perform other computations (e.g., decrypting) related to and/or unrelated to the presence detection process during and/or after waiting. In some implementations, however, the waiting asset may be in an idle state while waiting.

For instance, the presence detection process can include transmitting (e.g., by the second asset) a reply message at a reply message transmit time. The reply message transmit time can be based at least in part on the challenge response delay. For example, the reply message transmit time can be or can include a combination (e.g., addition) of the challenge message receive time and/or the challenge response delay. For instance, the challenge response delay can specify a time for the second asset to wait after receiving the challenge message, and/or the reply message transmit time can be established to conform to the challenge response delay.

In some implementations, the reply message can be or can include an identifier, such as a nonce. For example, in some implementations, the reply message can include the identifier that is transmitted in the challenge message. For instance, in some implementations the first asset can compare the identifier transmitted in the reply message to the identifier transmitted in the challenge message. If the identifiers match, it can be indicative that the second asset was able to understand (e.g., decrypt) the (e.g., encrypted) challenge message, which can be indicative of trustworthiness of the first asset and/or second asset. Additionally and/or alternatively, the reply message can be or can include the reply message transmit time.

In some implementations, the reply message can be encrypted. As one example, the reply message can be encrypted by public-key cryptography. For instance, in some implementations, a public key of the second asset can be used to encrypt (e.g., by the second asset) the reply message. Additionally and/or alternatively, in some implementations, a private key of the second asset can be used to encrypt (e.g., by the second asset) the reply message. For instance, in some implementations, a public key of the second asset can be used to decrypt (e.g., by the first asset) the reply message. Additionally and/or alternatively, in some implementations, a private key of the second asset can be used to decrypt (e.g., by the first asset) the reply message.

The presence detection process can include receiving (e.g., by the first asset) the reply message. The reply message can be received by the first asset at a reply message receive time. For instance, the reply message receive time can be a time (e.g., as measured by a clock of the first asset) at which the reply message is partially and/or completely captured (e.g., by a signal receptor, antenna, etc.), recorded (e.g., in a memory device, etc.), and/or otherwise suitably present at the first asset.

The presence detection process can include verifying (e.g., by the first asset) the second asset. For example, the second asset can be verified as a member of a secure network, granted access to secure resources, etc. The second asset can be verified based on a comparison of the reply message receive time to a valid reply message receive time span. For example, if the reply message receive time is not within the valid reply message receive time span, the second asset may not be verified. If the reply message receive time is within the valid reply message receive time span, the second asset can be verified. Additional verification steps can be performed, such as if the reply message receive time is within the valid reply message receive time span. For instance, in some implementations, a unique identifier included in the reply message can be verified as being identical to and/or otherwise predictably derived from a unique identifier included in the challenge message.

The valid reply message receive time span can be based at least in part on the challenge message transmit time and the challenge response delay. For example, in some implementations, the valid reply message receive time span can be a combination (e.g., addition) of the challenge message transmit time and the challenge response delay. Additionally, the valid reply message receive time span can accommodate travel time for distances within a distance span.

For instance, in some implementations, the valid reply message receive time span can include an earliest valid reply message receive time and/or a latest valid reply message receive time. In some implementations, the earliest valid reply message receive time and/or the latest valid reply message receive time can be established based at least in part on signal travel time and/or minimum valid distance and/or maximum valid distance between the first asset and the second asset. Additionally and/or alternatively, in some implementations, the valid reply message receive time span can be established based on a window duration, such as an arbitrary window duration.

In some implementations, the earliest valid reply message receive time can be established based at least in part on signal travel time (e.g., two-way signal travel time) for a minimum valid distance between the first asset and the second asset. For instance, in some implementations, the earliest valid reply message receive time can be established as a combination of the challenge message transmit time and the challenge response delay (e.g., if there is no travel time between the first and second asset). For example, in some implementations, a minimum valid distance can be about zero meters. Additionally and/or alternatively, in some implementations, the latest valid reply message receive time can be established based at least in part on signal travel time (e.g., two-way signal travel time) for a maximum valid distance between the first asset and the second asset. For instance, the latest valid reply message receive time can be established as a combination of the challenge message transmit time, the challenge response delay, and two-way signal travel time for the maximum valid distance (e.g., if the speed at which the signal travels is known, such as at the speed of light). For example, in some implementations, a maximum valid distance can be greater than about zero meters, such as about 100 meters, such as about 150 meters, such as about 300 meters. Increasing the maximum valid distance can allow for verification of assets separated by greater distances, but may provide a larger window for adversarial communications.

Additionally and/or alternatively, in some implementations, the valid reply message receive time span can be established based on a window duration, such as an arbitrary window duration. For example, the maximum valid reply message receive time can be established as a combination of the minimum valid reply message receive time (e.g., as a combination of the challenge message transmit time and challenge response delay) and the window duration. For example, in some implementations, the window duration can be about one microsecond.

As can be appreciated by one of skill in the art, time spans based on signal travel time at the speed of light can, in some cases, require precise time keeping and/or computations, such as on the order of only a few microseconds. Enforcing time frames at such magnitudes (e.g., on the order of less than 10 microseconds) can prevent adversarial parties from successfully infiltrating secure systems while reliably allowing trusted assets to be successfully verified. As one example, having strict valid time spans can reduce a likelihood of a successful replay attack. For instance, the valid reply message receive time span can be selected to be small enough that a replay attack cannot successfully transmit a captured (e.g., and potentially otherwise valid) signal from a first location to a second location quickly enough, as the relay would likely take on the order of milliseconds. As another example, having a response delay that is known only to proper assets (e.g., by encryption) can prevent adversarial parties from responding in the valid reply message receive time window. For example, secure encryption can prevent adversarial parties from learning the response delay. Additionally, even if the encryption were broken by an adversarial party, this process can take longer than is allowed by the first asset. For example, adversarial decryption can take longer than is allowed by the response delay.

Additionally, the valid reply message receive time span can include additional tolerances (e.g., increase in latest valid time and/or decrease in earliest valid time) to accommodate imprecisions in the communication. For example, the additional tolerances can account for clock shifts at either or both of the first asset and/or the second asset. As another example, the additional tolerances can account for clock precision (e.g., rounding). As another example, the additional tolerances can account for time desynchronization (e.g., minor desynchronization, such as on the order of a few clock cycles) between the first asset and the second asset.

The presence detection process can additionally include steps directed to verifying the first asset with the second asset after the second asset is verified with the first asset, as described above. For instance, the reply message from the second asset can additionally include a reply response delay. Similar to the challenge response delay, the reply response delay can specify a time duration that the first asset is to wait before responding (e.g., transmitting a response) to the reply message. The reply response delay can specify a time duration that the first asset is to wait before responding (e.g., transmitting a response) to the reply message. For instance, the reply response delay can specify the time duration in such a manner that only trusted systems, such as the first asset, can understand (e.g., by encryption). Thus, an adversarial party can be prevented from knowing when to respond to the reply message. Thus, confirmation messages that do not conform to the reply response delay can have a high likelihood of sourcing from an adversarial party and/or may be discarded, blocked, and/or otherwise ignored by the second asset.

The first asset can wait for a time duration that is specified by the reply response delay. For example, the reply response delay can specify a time duration to wait after some known time, such as, for example, the reply message transmit time and/or the reply message receive time. For example, in some implementations, the reply response delay can specify a time duration to wait after the reply message receive time. As another example, the reply response delay can specify a time duration to wait after a decrypting process is complete (e.g., if the decrypting process has a known compute time).

The time duration can be specified in any suitable format in accordance with example aspects of the present disclosure. As one example, the time duration can be or can include a number of seconds, such as a fractional number of seconds (e.g., milliseconds, microseconds, etc.). As another example, the time duration can be or can include a number of clock cycles.

As used herein, "waiting" refers to allowing a time duration to lapse before a response is transmitted from a waiting asset (e.g., the first asset), and does not necessarily correspond to an idle state of the waiting asset. For example, the waiting asset may perform other computations (e.g., decrypting) related to and/or unrelated to the presence detection process during and/or after waiting. In some implementations, however, the waiting asset may be in an idle state while waiting.

For instance, the presence detection process can include transmitting (e.g., by the first asset) a confirmation message at a confirmation message transmit time. The confirmation message transmit time can be based at least in part on the reply response delay. For example, the confirmation message transmit time can be or can include a combination (e.g., addition) of the reply message receive time and/or the reply response delay. For instance, the reply response delay can specify a time for the first asset to wait after receiving the reply message, and/or the confirmation message transmit time can be established to conform to the reply response delay.

In some implementations, the confirmation message can be or can include an identifier, such as a nonce. For example, in some implementations, the confirmation message can include the identifier that is transmitted in the reply message and/or the challenge message. For instance, in some implementations, the second asset can compare the identifier transmitted in the confirmation message to the identifier transmitted in the reply message. If the identifiers match, it can be indicative that the first asset was able to understand (e.g., decrypt) the (e.g., encrypted) reply message, which can be indicative of trustworthiness of the first asset and/or second asset. Additionally and/or alternatively, the confirmation message can be or can include the confirmation message transmit time.

In some implementations, the confirmation message can be encrypted. As one example, the confirmation message can be encrypted by public-key cryptography. For instance, in some implementations, a public key of the first asset can be used to encrypt (e.g., by the first asset) the confirmation message. Additionally and/or alternatively, in some implementations, a private key of the first asset can be used to encrypt (e.g., by the first asset) the confirmation message. For instance, in some implementations, a public key of the first asset can be used to decrypt (e.g., by the second asset) the confirmation message. Additionally and/or alternatively, in some implementations, a private key of the first asset can be used to decrypt (e.g., by the second asset) the confirmation message.

The presence detection process can include receiving (e.g., by the second asset) the confirmation message. The confirmation message can be received by the second asset at a confirmation message receive time. For instance, the confirmation message receive time can be a time (e.g., as measured by a clock of the second asset) at which the confirmation message is partially and/or completely captured (e.g., by a signal receptor, antenna, etc.), recorded (e.g., in a memory device, etc.), and/or otherwise suitably present at the second asset.

The presence detection process can include verifying (e.g., by the second asset) the first asset. For example, the first asset can be verified as a member of a secure network, granted access to secure resources, etc. The first asset can be verified based on a comparison of the confirmation message receive time to a valid confirmation message receive time span. For example, if the confirmation message receive time is not within the valid confirmation message receive time span, the first asset may not be verified. If the confirmation message receive time is within the valid confirmation message receive time span, the first asset can be verified. Additional verification steps can be performed, such as if the confirmation message receive time is within the valid confirmation message receive time span. For instance, in some implementations, a unique identifier included in the confirmation message can be verified as being identical to and/or otherwise predictably derived from a unique identifier included in the reply message.

The valid confirmation message receive time span can be based at least in part on the reply message transmit time and the reply response delay. For example, in some implementations, the valid confirmation message receive time span can be a combination (e.g., addition) of the reply message transmit time and the reply response delay. Additionally, the valid confirmation message receive time span can accommodate travel time for distances within a distance span.

For instance, in some implementations, the valid confirmation message receive time span can include an earliest valid confirmation message receive time and/or a latest valid confirmation message receive time. In some implementations, the earliest valid confirmation message receive time and/or the latest valid confirmation message receive time can be established based at least in part on signal travel time and/or minimum valid distance and/or maximum valid distance between the second asset and the first asset. Additionally and/or alternatively, in some implementations, the valid confirmation message receive time span can be established based on a window duration, such as an arbitrary window duration.

In some implementations, the earliest valid confirmation message receive time can be established based at least in part on signal travel time (e.g., two-way signal travel time) for a minimum valid distance between the second asset and the first asset. For instance, in some implementations, the earliest valid confirmation message receive time can be established as a combination of the reply message transmit time and the reply response delay (e.g., if there is no travel time between the second and first asset). For example, in some implementations, a minimum valid distance can be about zero meters. Additionally and/or alternatively, in some implementations, the latest valid confirmation message receive time can be established based at least in part on signal travel time (e.g., two-way signal travel time) for a maximum valid distance between the second asset and the first asset. For instance, the latest valid confirmation message receive time can be established as a combination of the reply message transmit time, the reply response delay, and two-way signal travel time for the maximum valid distance (e.g., if the speed at which the signal travels is known, such as at the speed of light). For example, in some implementations, a maximum valid distance can be greater than about zero meters, such as about 100 meters, such as about 150 meters, such as about 300 meters. Increasing the maximum valid distance can allow for verification of assets separated by greater distances, but may provide a larger window for adversarial communications.

Additionally and/or alternatively, in some implementations, the valid confirmation message receive time span can be established based on a window duration, such as an arbitrary window duration. For example, the maximum valid confirmation message receive time can be established as a combination of the minimum valid confirmation message receive time (e.g., as a combination of the reply message transmit time and reply response delay) and the window duration. For example, in some implementations, the window duration can be about one microsecond.

Some or all messages from the assets, such as, for instance, the challenge message, reply message, confirmation message, and/or any other suitable messages can be or can include a response delay. As an example, the challenge message can include a challenge response delay. For instance, the challenge response delay can be specified by the first asset. As another example, in some implementations, the reply message can include a reply response delay. The reply response delay can be uniquely specified by the second asset and/or be the same as the challenge response delay. A response delay can be indicative of a time duration that a receiving asset must wait before replying to the message. A response delay can encode the time duration in computer-readable data in any suitable format according to example aspects of the present disclosure. For example, the response delay can be or can include a computer-readable data entry, such as a plurality of bits. The response delay can be arbitrarily determined, such as randomly determined (e.g., at startup, for each transmission, etc.). Additionally and/or alternatively, the response delay can be fixed.

Additionally and/or alternatively, some or all messages from the assets, such as, for instance, the challenge message, reply message, confirmation message, and/or any other suitable messages can be or can include an identifier, such as a unique transmission identifier. The identifier can provide a unique data entry that can be useful in differentiating the message from other similar messages, such as, for example, earlier and/or subsequent messages. Including an identifier can be useful in preventing attacks, such as, for example, replay attacks. Additionally and/or alternatively, the identifier can be useful in categorizing and/or cataloging the messages. For instance, the identifier can be used in hash functions, as initializations, etc. In some implementations, the identifier can be cryptographically signed.

In some implementations, the identifier can be or can include a nonce. For instance, the nonce can be or can include an arbitrary number that can be used once in a communication. As an example, the nonce can be or can include a random number and/or pseudo-random number, such as a number from an authentication protocol.

As another example, in some implementations, the identifier can be or can include a counter, such as a transmission counter. For instance, the transmission counter can increment and/or decrement with each subsequent transmission, such as each challenge message.

Additionally and/or alternatively, some or all messages from the assets, such as, for instance, the challenge message, reply message, confirmation message, and/or any other suitable messages can be or can include a transmit time. For example, the challenge message can be or can include a challenge message transmit time. As another example, the reply message can be or can include a reply message transmit time. As another example, the confirmation message can be or can include a confirmation message transmit time. For instance, a transmit time can be or can include a time, such as a time according to a clock of the first asset and/or second asset, from which the message is transmitted. The transmit time can be encoded in any suitable computer-readable format, such as a computer-readable format useful for time values. As another example, the transmit time can be or can include a count of clock cycles.

Some or all messages from the assets, such as, for instance, the challenge message, reply message, confirmation message, and/or any other suitable messages, can be transmitted according to any suitable transmission protocol, such as wired and/or wireless transmission protocols. For instance, in some implementations, the messages can be transmitted by a low energy wireless protocol, such as, for instance, Bluetooth Low Energy (BLE).

Some or all messages from the assets, such as, for instance, the challenge message, reply message, confirmation message, and/or any other suitable messages, can be encrypted. For instance, encrypting the messages can prevent unintended recipients of the messages from interpreting data present in the challenge message, such as the response delay. The challenge message can be encrypted by any suitable encryption protocol, such as, for example, public-key cryptography. As one example, each of the first asset and the second asset can have an associated public key and/or private key. The public key(s) can be readily distributed while maintaining secrecy of the cryptography protocol as long as the private key(s) are known only to their respective asset. Messages transmitted by the assets (e.g., challenge message, reply message, etc.) can be encrypted with the public key and/or the private key of the transmitting asset and/or receiving asset. For example, messages to be received by a receiving asset (e.g., one of the first or second assets) can be encrypted with the receiving asset's public key such that the messages can only be decrypted by the receiving asset in possession of its private key. Additionally and/or alternatively, the messages can be encrypted using the private key and decrypted with the respective public key.

Although example aspects of the present disclosure are discussed herein with regard to a first asset and a second asset, it should be understood by one of ordinary skill in the art that any suitable number of assets, such as three or more assets, can be utilized in accordance with example aspects of the present disclosure. For instance, verifying an asset can require individual and/or collective verification from two or more trusted assets. For example, the detection processes described herein can be performed by a plurality of trusted assets and/or the asset can be verified based on some agreement between the plurality of assets (e.g., majority agreement, consensus, fractional and/or percentage agreement, etc.).

In some implementations, an additional verification step can be performed prior to transmitting the challenge message. For example, in some cases, it can be desirable for the first asset to be silent (e.g., not transmitting) unless expected to be in a secure location. This can be useful, for instance, to prevent advertising even a presence of the first asset.

For instance, in some implementations, the asset can obtain one or more ambient condition measurements of different ambient conditions. A trusted site can transmit an encoded signal that contains ambient condition measurements at the trusted site. The asset can verify that the ambient conditions at the asset match, at least to within some degree, the ambient conditions at the trusted site before transmitting. Example ambient conditions that can be measured and/or transmitted can include, but may not be limited to, barometric pressure, humidity (e.g., relative humidity), temperature, noise level (e.g., ambient noise level), light level (e.g., ambient light level), electromagnetic interference, geomagnetic fields, particulate matter, air and/or gas composition, echo, other electrical signals (e.g., presence of and/or absence of wireless communication signals) and/or any other suitable ambient conditions.

While it can be desirable to allow the asset to determine that it is at a trusted site, it can additionally be useful in verifying the asset. For instance, in some implementations, the asset can be made to encode its own ambient conditions and/or transmit them to the trusted site. This may then be used by the trusted site to gain trust that the asset is physically present and/or the signal is not being relayed from a different location.

In some implementations, the ambient conditions of the trusted site can be relayed from ambient conditions of other trusted assets. The trusted site can decode and combine signals from multiple trusted assets (e.g., into its own ground truth measurement) to generate the ambient condition measurements to which a challenging asset's conditions are compared. For instance, a plurality of trusted assets that have been identified and verified as on site can form an ad hoc sensor network providing monitoring of various conditions around the site.

As another example, in some implementations, an asset could use signal based positioning techniques to determine location (e.g., indoors). For instance, the asset can scan for nearby signals to obtain a signal profile (e.g., Wi-Fi, 802.15.4, etc.). The signal profile can be uploaded to determine location. In some instances, the signal profile can be based on absence of signals and/or presence of signals, as in some cases absence of signals can be more convincing than presence of signals, as absence of signals can be more challenging to spoof. The signal profile can include any suitable information about the signals, such as, for example, a MAC address (e.g., of a transmitting device), communication protocol, frequency, SSID, etc. As another example, the asset could search for the presence of a continuous activation signal before transmitting a challenge message.

For instance, in some implementations, a positioning system (e.g., GPS, GLONASS, etc.) can be used to limit transmissions from an asset unless the asset is coarsely within an area. For example, a positioning system component can be included in the asset, and the asset can transmit in response to the positioning system component indicating that the asset is within a geofenced area.

In some implementations, a challenging asset can verify that it is on site by requiring signals from more than one trusted asset (e.g., from a plurality of different directions). For instance, the challenging asset can determine that multiple signals are coming from sources in distinct locations. The challenging asset can determine an angle (e.g., a rough angle, such as hemisphere) that a signal comes from and thus determine that different signals are coming from different places. Multiple transmitters on a site can transmit identifiable signals. Thus, the challenging asset can determine that it is on site through the presence of these multiple signals from different directions. The multiple signals can each be transmitted by a same protocol and/or a plurality of protocols. For example, in some cases, each signal can have one unique protocol which can be matched to a particular known protocol for that signal when transmitted to the asset. As another example, one or more of the signals can be multimodal in that the signals can each be transmitted across a plurality of protocols.

In some implementations, an asset can link to another device, such as a user device (e.g., a cell phone, smartphone, etc.) to receive some or all data. For example, the asset can be configured for some transmissions with a trusted site, and data from the transmissions (e.g., ambient conditions) can be sourced from another device, such as a smartphone.

In some implementations, the asset can be turned on and/or off manually by a user. For instance, the user can turn the asset on and enable a presence detection message when the user expects to be in a vicinity of the trusted site.

Systems and methods according to example aspects of the present disclosure can achieve a number of technical effects and benefits including, for example, improvements to computing technologies. As one example, systems and methods according to example aspects of the present disclosure can provide improved robustness and/or security associated with presence detection. For instance, transmitting a response delay in a message (e.g., challenge message) can provide for establishment of a determinate, known, and/or precise window in which replies to the message (e.g., reply message) are expected to be received. It can be difficult and/or impossible for an adversarial party to learn the response delay prior to the window expiring, which can frustrate adversarial parties' attempts to reply to the challenge message, providing for improved security and/or robustness. Additional factors such as, for example, identifier verification and/or matching, encryption (e.g., public-key encryption), time stamp verification, etc. can provide additional layers of security which can frustrate adversarial parties' attempts to infiltrate a trusted system. For instance, some or all implementations according to example aspects of the present disclosure can provide for no known manner of infiltration, especially with conventional hardware.

Additionally and/or alternatively, systems and methods according to example aspects of the present disclosure can provide for secure and/or robust presence detection systems that experience reduced power usage. For example, some implementations of the present disclosure can operate with minimal electronic components (e.g., a transmit/receive antenna, clock, simple processor, etc.) that can experience limited power consumption. Additionally, some implementations of the present disclosure can avoid relatively power-costly electronic components such as, for example, some sensors (e.g., microphones, cameras, light sensitive sensors, pressure sensors, etc.), internet-capable antennas, or other such components, which can reduce power consumption compared to some existing presence detection methods. For instance, the reduced power consumption can provide for improved battery life, prolonged time between battery and/or system replacement and/or recharging, etc. Implementations of the present disclosure including such power-costly components (e.g., providing supplementary identifier data, etc.), however, are within the scope of the present disclosure and are not precluded from inclusion, such as when desirable.

Referring now to the Figures, example implementations according to example aspects of the present disclosure will be discussed in detail. One of ordinary skill in the art should understand that various components, features, and/or other elements described in the Figures may be changed, altered, replaced, supplemented, expanded, omitted, and/or otherwise modified without departing from the scope or spirit of the present disclosure.

FIG. 1 depicts a timing diagram 100 of an example method for presence detection according to example implementations of the present disclosure. Timing diagram 100 can begin at challenge message transmit time 102. A challenge message can be transmitted from a first asset to a second asset at challenge message transmit time 102. For instance, the first asset can transmit the challenge message when it is desirable for the first asset and/or the second asset to be verified. In some implementations, the challenge message transmit time 102 can occur arbitrarily (e.g., randomly), periodically (e.g., in set intervals), and/or in response to one or more stimuli (e.g., a request message, such as a message from another asset). Challenge message transmit time 102 can mark any suitable point before and/or at which the challenge message has entirely left the first asset. For example, the challenge message transmit time 102 can correspond to a point at and/or before a first bit of the challenge message is transmitted by the first asset. As another example, the challenge message transmit time 102 can correspond to a point at and/or before a last bit of the challenge message has been transmitted by the first asset. As another example, the challenge message transmit time 102 can correspond to a point at which a median bit of the challenge message is transmitted by the first asset.

Timing diagram 100 can include challenge message transmit duration 103. Challenge message transmit duration can span from challenge message transmit time 102 to challenge message receive time 104. During challenge message transmit duration 103, the challenge message can be transmitted from a first asset to a second asset. For example, the challenge message can be transmitted bitwise (e.g., one or more bits at a time, such as in one or more packets) and/or in any other suitable manner. Challenge message transmit duration 103 can correspond to a period of time from start to finish of the transmission. The challenge message can be transmitted according to any suitable transmission protocol, such as wired and/or wireless transmission protocols. For instance, in some implementations, the challenge message can be transmitted by a low energy wireless protocol, such as, for instance, Bluetooth Low Energy (BLE).

The challenge message can be received by an asset (e.g., a second asset) at challenge message receive time 104. Challenge message receive time 104 can mark any suitable point before at which and/or after (e.g., closely after) the challenge message has entirely been received and/or recorded by the second asset. For example, the challenge message receive time 104 can correspond to a point at which a first bit of the challenge message is received by the second asset. As another example, the challenge message receive time 104 can correspond to a point at which a last bit of the challenge message has been received by the second asset. As another example, the challenge message receive time 104 can correspond to a point at which a median bit of the challenge message is received by the second asset.

Timing diagram 100 can include computing time 105 and/or wait time 107. For instance, wait time 107 (e.g., alone and/or in combination with computing time 105) can represent a time duration that is specified by a challenge response delay included in the challenge message for which the second asset should wait before responding to the challenge message. For example, the challenge response delay can specify a time duration to wait after some known time, such as, for example, the challenge message transmit time and/or the challenge message receive time. For example, in some implementations, the challenge response delay can specify a time duration to wait after the challenge message receive time (e.g., the combination of computing time 105 and/or wait time 107). As another example, the challenge response delay can specify a time duration to wait after a computing process (e.g., decrypting process) is complete. For instance, decrypting the challenge message can take an amount of time represented by computing time 105. Wait time 107 can correspond directly to the challenge response delay and/or the remaining time specified by the challenge response delay after the computing process is performed over computing time 105.

As used herein, "waiting" refers to allowing a time duration to lapse before a response is transmitted from a waiting asset (e.g., the second asset), and does not necessarily correspond to an idle state of the waiting asset. For example, the waiting asset may perform other computations (e.g., decrypting) related to and/or unrelated to the presence detection process during and/or after waiting. In some implementations, however, the waiting asset may be in an idle state while waiting.

A reply message can be transmitted from a second asset to a first asset at reply message transmit time 106. The reply message transmit time 106 can be based at least in part on a challenge response delay included in the challenge message. For example, the reply message transmit time 106 can be or can include a combination (e.g., addition) of the challenge message receive time 104 and/or the challenge response delay. For instance, the challenge response delay can specify a time for the second asset to wait after receiving the challenge message (e.g., at challenge message receive time 104), and/or the reply message transmit time 106 can be established to conform to the challenge response delay.

Timing diagram 100 can include reply message transmit duration 109. Reply message transmit duration 109 can span from reply message transmit time 106 to reply message receive time 108. During reply message transmit duration 109, the reply message can be transmitted from a first asset to a second asset. For example, the reply message can be transmitted bitwise (e.g., one or more bits at a time, such as in one or more packets) and/or in any other suitable manner. Reply message transmit duration 109 can correspond to a period of time from start to finish of the transmission. The reply message can be transmitted according to any suitable transmission protocol, such as wired and/or wireless transmission protocols. For instance, in some implementations, the reply message can be transmitted by a low energy wireless protocol, such as, for instance, Bluetooth Low Energy (BLE).

The reply message can be received by an asset (e.g., the first asset) at reply message receive time 108. For instance, after the reply message is received by the first asset at reply message receive time 108, the first asset can verify the second asset. For example, the second asset can be verified as a member of a secure network, granted access to secure resources, etc. The second asset can be verified based on a comparison of the reply message receive time 108 to a valid reply message receive time span 110. For example, if the reply message receive time 108 is not within the valid reply message receive time span 110, the second asset may not be verified. If the reply message receive time 108 is within the valid reply message receive time span 110, the second asset can be verified. Additional verification steps can be performed, such as if the reply message receive time 108 is within the valid reply message receive time span 110. For instance, in some implementations, a unique identifier included in the reply message can be verified as being identical to and/or otherwise predictably derived from a unique identifier included in the challenge message.

The valid reply message receive time span 110 can be based at least in part on the challenge message transmit time 102 and the challenge response delay. For example, in some implementations, the valid reply message receive time span 110 can be a combination (e.g., addition) of the challenge message transmit time 102 and the challenge response delay. Additionally, the valid reply message receive time span 110 can accommodate travel time for distances within a distance span.

For instance, in some implementations, the valid reply message receive time span 110 can include an earliest valid reply message receive time 111 and/or a latest valid reply message receive time 112. In some implementations, the earliest valid reply message receive time 111 and/or the latest valid reply message receive time 112 can be established based at least in part on signal travel time and/or minimum valid distance and/or maximum valid distance between the first asset and the second asset. Additionally and/or alternatively, in some implementations, the valid reply message receive time span 110 can be established based on a window duration, such as an arbitrary window duration.

In some implementations, the earliest valid reply message receive time 111 can be established based at least in part on signal travel time (e.g., two-way signal travel time) for a minimum valid distance between the first asset and the second asset. For instance, in some implementations, the earliest valid reply message receive time 111 can be established as a combination of the challenge message transmit time and the challenge response delay (e.g., if there is no travel time between the first and second asset). For example, in some implementations, a minimum valid distance can be about zero meters. Additionally and/or alternatively, in some implementations, the latest valid reply message receive time 112 can be established based at least in part on signal travel time (e.g., two-way signal travel time) for a maximum valid distance between the first asset and the second asset. For instance, the latest valid reply message receive time 112 can be established as a combination of the challenge message transmit time, the challenge response delay, and two-way signal travel time for the maximum valid distance (e.g., if the speed at which the signal travels is known, such as at the speed of light). For example, in some implementations, a maximum valid distance can be greater than about zero meters, such as about 100 meters, such as about 150 meters, such as about 300 meters. Increasing the maximum valid distance can allow for verification of assets separated by greater distances, but may provide a larger window for adversarial communications.

Additionally and/or alternatively, in some implementations, the valid reply message receive time span 110 can be established based on a window duration, such as an arbitrary window duration. For example, the maximum valid reply message receive time can be established as a combination of the minimum valid reply message receive time (e.g., as a combination of the challenge message transmit time and challenge response delay) and the window duration. For example, in some implementations, the window duration can be about one microsecond.

As can be appreciated by one of skill in the art, time spans based on signal travel time at the speed of light can, in some cases, require precise time keeping and/or computations, such as on the order of only a few microseconds. Enforcing time frames at such magnitudes (e.g., on the order of less than 10 microseconds) can prevent adversarial parties from successfully infiltrating secure systems while reliably allowing trusted assets to be successfully verified. As one example, having strict valid time spans can reduce a likelihood of a successful replay attack. For instance, the valid reply message receive time span 110 can be selected to be small enough that a replay attack cannot successfully transmit a captured (e.g., and potentially otherwise valid) signal from a first location to a second location quickly enough, as the relay would likely take on the order of milliseconds. As another example, having a response delay that is known only to proper assets (e.g., by encryption) can prevent adversarial parties from responding in the valid reply message receive time 108 window. For example, secure encryption can prevent adversarial parties from learning the response delay. Additionally, even if the encryption were broken by an adversarial party, this process can take longer than is allowed by the first asset. For example, adversarial decryption can take longer than is allowed by the response delay.

Additionally, the valid reply message receive time span 110 can include additional tolerances (e.g., increase in latest valid time and/or decrease in earliest valid time) to accommodate imprecisions in the communication. For example, the additional tolerances can account for clock shifts at either or both of the first asset and/or the second asset. As another example, the additional tolerances can account for clock precision (e.g., rounding). As another example, the additional tolerances can account for time desynchronization (e.g., minor desynchronization, such as on the order of a few clock cycles) between the first asset and the second asset.

A length of challenge message transmit duration 103 and/or reply message transmit duration 109 can be affected based at least in part on a distance between a first asset and a second asset. For instance, the speed at which the signal travels can be known (e.g., such as at the speed of light) such that the length of the durations 103, 109 can be directly correlated to distance based on a known and/or constant signal travel speed. Thus, for instance, it can be possible to validate messages received at an asset by verifying that the messages are transmitted and/or received within a time span based on a desired minimum and/or maximum valid distance between the assets.

Figure 2:
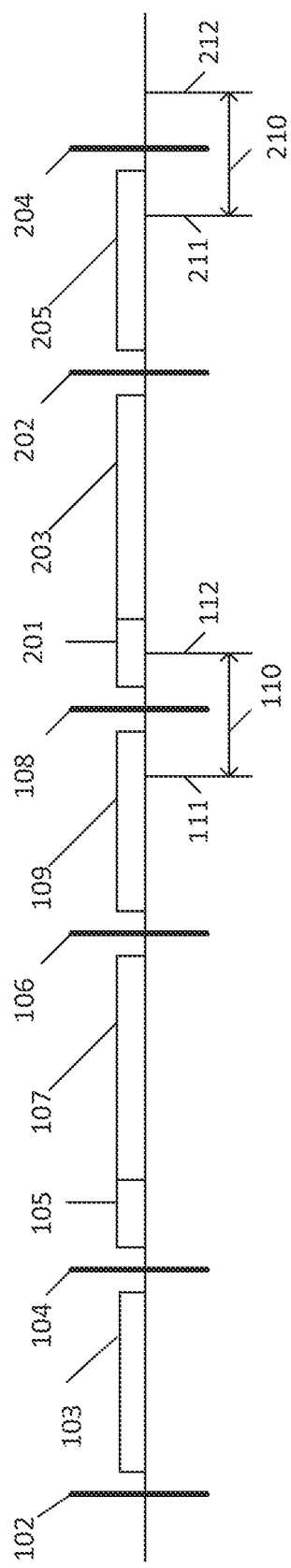
FIG. 2 depicts a timing diagram of an example method for presence detection according to example implementations of the present disclosure.

FIG. 2 depicts a timing diagram 200 of an example method for presence detection according to example implementations of the present disclosure. Timing diagram 200 can include components discussed with reference to timing diagram 100 of FIG. 1, such as, for instance, challenge message transmit time 102, challenge message receive time 104, etc. Additionally, timing diagram 200 can include timings relating to steps directed to verifying a first asset with the second asset after the second asset is verified with the first asset, as described above with regard to FIG. 1.

Timing diagram 200 can include computing time 201 and/or wait time 203. For instance, wait time 203 (e.g., alone and/or in combination with computing time 201) can represent a time duration that is specified by a reply response delay included in the reply message for which the second asset should wait before responding to the reply message. For example, the reply response delay can specify a time duration to wait after some known time, such as, for example, the reply message transmit time 106 and/or the reply message receive time 108. For example, in some implementations, the reply response delay can specify a time duration to wait after the reply message receive time 108 (e.g., the combination of computing time 201 and/or wait time 203). As another example, the reply response delay can specify a time duration to wait after a computing process (e.g., decrypting process) is complete. For instance, decrypting the reply message can take an amount of time represented by computing time 201. Wait time 203 can correspond directly to the reply response delay and/or the remaining time specified by the reply response delay after the computing process is performed over computing time 201.

As used herein, "waiting" refers to allowing a time duration to lapse before a response is transmitted from a waiting asset (e.g., the first asset), and does not necessarily correspond to an idle state of the waiting asset. For example, the waiting asset may perform other computations (e.g., decrypting) related to and/or unrelated to the presence detection process during and/or after waiting. In some implementations, however, the waiting asset may be in an idle state while waiting.

A confirmation message can be transmitted from a first asset to a second asset at confirmation message transmit time 202. The confirmation message transmit time 202 can be based at least in part on a reply response delay included in the reply message. For example, the confirmation message transmit time 202 can be or can include a combination (e.g., addition) of the reply message receive time 108 and/or the reply response delay. For instance, the reply response delay can specify a time for the first asset to wait after receiving the reply message (e.g., at reply message receive time 108), and/or the confirmation message transmit time 202 can be established to conform to the reply response delay.

Timing diagram 200 can include confirmation message transmit duration 205. Confirmation message transmit duration can span from confirmation message transmit time 202 to confirmation message receive time 204. During confirmation message transmit duration 205, the confirmation message can be transmitted from a first asset to a second asset. For example, the confirmation message can be transmitted bitwise (e.g., one or more bits at a time, such as in one or more packets) and/or in any other suitable manner. Confirmation message transmit duration 205 can correspond to a period of time from start to finish of the transmission. The confirmation message can be transmitted according to any suitable transmission protocol, such as wired and/or wireless transmission protocols. For instance, in some implementations, the confirmation message can be transmitted by a low energy wireless protocol, such as, for instance, Bluetooth Low Energy (BLE).

The confirmation message can be received by an asset (e.g., the second asset) at confirmation message receive time 204. For instance, after the confirmation message is received by the second asset at confirmation message receive time 204, the second asset can verify the first asset. For example, the first asset can be verified as a member of a secure network, granted access to secure resources, etc. The first asset can be verified based on a comparison of the confirmation message receive time 204 to a valid confirmation message receive time span 210. For example, if the confirmation message receive time 204 is not within the valid confirmation message receive time span 210, the first asset may not be verified. If the confirmation message receive time 204 is within the valid confirmation message receive time span 210, the first asset can be verified. Additional verification steps can be performed, such as if the confirmation message receive time 204 is within the valid confirmation message receive time span 210. For instance, in some implementations, a unique identifier included in the confirmation message can be verified as being identical to and/or otherwise predictably derived from a unique identifier included in the reply message.

The valid confirmation message receive time span 210 can be based at least in part on the reply message transmit time 106 and the reply response delay. For example, in some implementations, the valid confirmation message receive time span 210 can be a combination (e.g., addition) of the reply message transmit time 106 and the reply response delay. Additionally, the valid confirmation message receive time span 210 can accommodate travel time for distances within a distance span.

For instance, in some implementations, the valid confirmation message receive time span 210 can include an earliest valid confirmation message receive time 211 and/or a latest valid confirmation message receive time 212. In some implementations, the earliest valid confirmation message receive time 211 and/or the latest valid confirmation message receive time 212 can be established based at least in part on signal travel time and/or a minimum valid distance and/or maximum valid distance between the first asset and the second asset. Additionally and/or alternatively, in some implementations, the valid confirmation message receive time span 210 can be established based on a window duration, such as an arbitrary window duration.

In some implementations, the earliest valid confirmation message receive time 211 can be established based at least in part on signal travel time (e.g., two-way signal travel time) for a minimum valid distance between the first asset and the second asset. For instance, in some implementations, the earliest valid confirmation message receive time 211 can be established as a combination of the reply message transmit time and the reply response delay (e.g., if there is no travel time between the first and second asset). For example, in some implementations, a minimum valid distance can be about zero meters. Additionally and/or alternatively, in some implementations, the latest valid confirmation message receive time 212 can be established based at least in part on signal travel time (e.g., two-way signal travel time) for a maximum valid distance between the first asset and the second asset. For instance, the latest valid confirmation message receive time 212 can be established as a combination of the reply message transmit time, the reply response delay, and two-way signal travel time for the maximum valid distance (e.g., if the speed at which the signal travels is known, such as at the speed of light). For example, in some implementations, a maximum valid distance can be greater than about zero meters, such as about 100 meters, such as about 150 meters, such as about 300 meters. Increasing the maximum valid distance can allow for verification of assets separated by greater distances, but may provide a larger window for adversarial communications.

Additionally and/or alternatively, in some implementations, the valid confirmation message receive time span 210 can be established based on a window duration, such as an arbitrary window duration. For example, the maximum valid confirmation message receive time can be established as a combination of the minimum valid confirmation message receive time (e.g., as a combination of the reply message transmit time and reply response delay) and the window duration. For example, in some implementations, the window duration can be about one microsecond.

As can be appreciated by one of skill in the art, time spans based on signal travel time at the speed of light can, in some cases, require precise time keeping and/or computations, such as on the order of only a few microseconds. Enforcing time frames at such magnitudes (e.g., on the order of less than 10 microseconds) can prevent adversarial parties from successfully infiltrating secure systems while reliably allowing trusted assets to be successfully verified. As one example, having strict valid time spans can reduce a likelihood of a successful replay attack. For instance, the valid confirmation message receive time span 210 can be selected to be small enough that a replay attack cannot successfully transmit a captured (e.g., and potentially otherwise valid) signal from a first location to a second location quickly enough, as the relay would likely take on the order of milliseconds. As another example, having a response delay that is known only to proper assets (e.g., by encryption) can prevent adversarial parties from responding in the valid confirmation message receive time 204 window. For example, secure encryption can prevent adversarial parties from learning the response delay. Additionally, even if the encryption were broken by an adversarial party, this process can take longer than is allowed by the first asset. For example, adversarial decryption can take longer than is allowed by the response delay.

Additionally, the valid confirmation message receive time span 210 can include additional tolerances (e.g., increase in latest valid time and/or decrease in earliest valid time) to accommodate imprecisions in the communication. For example, the additional tolerances can account for clock shifts at either or both of the first asset and/or the second asset. As another example, the additional tolerances can account for clock precision (e.g., rounding). As another example, the additional tolerances can account for time desynchronization (e.g., minor desynchronization, such as on the order of a few clock cycles) between the first asset and the second asset.

A length of confirmation message transmit duration 205 can be affected based at least in part on a distance between a first asset and a second asset. For instance, a signal travel speed that messages travel at (e.g., such as at or nearly at the speed of light) can be known such that the length of the duration 205 can be directly correlated to distance based on a known and/or constant signal travel speed. Thus, for instance, it can be possible to validate messages received at an asset by verifying that the messages are transmitted and/or received within a time span based on a desired minimum and/or maximum valid distance between the assets.

Figure 3:
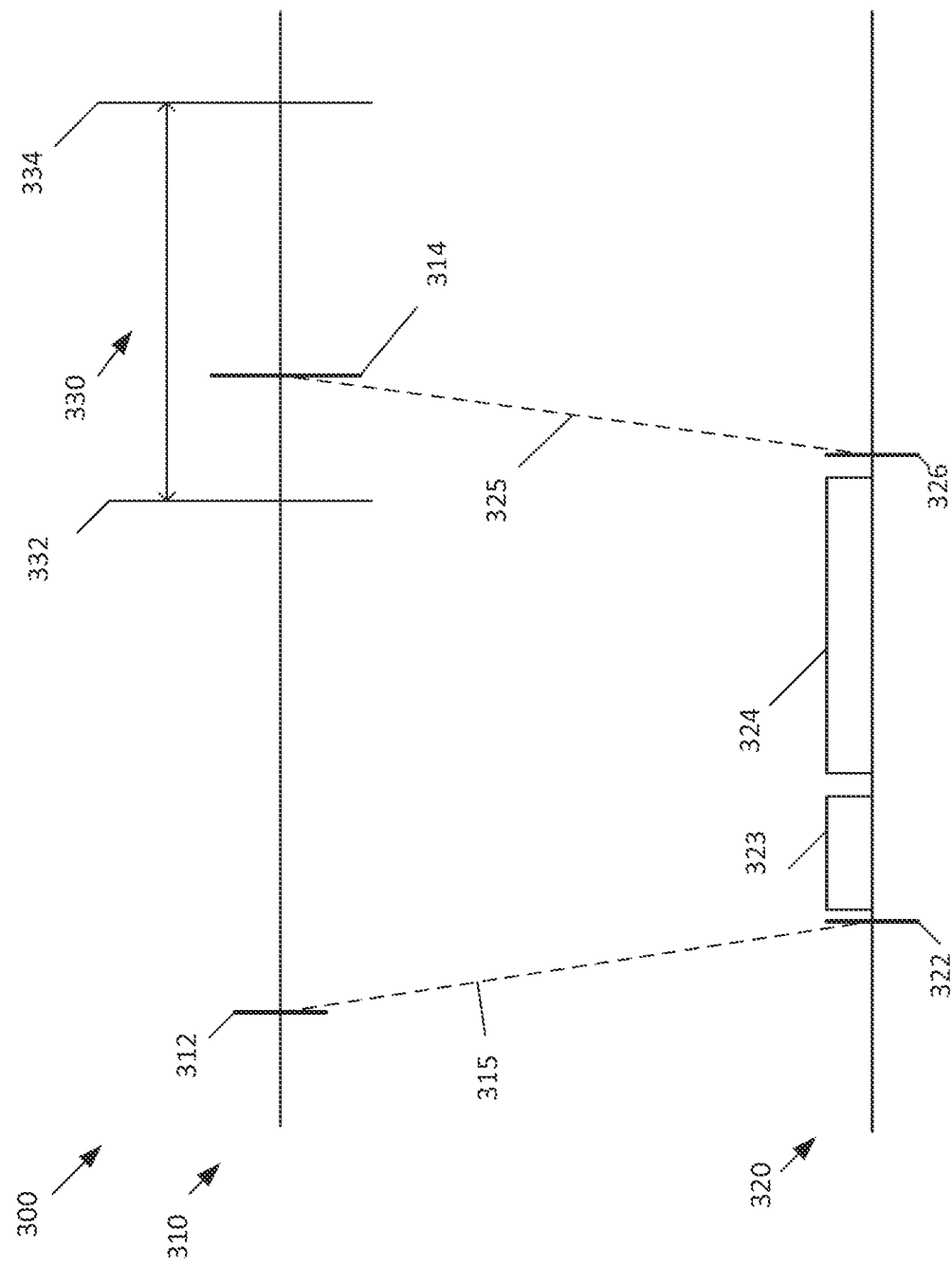
FIG. 3 depicts a timing diagram of an example method for presence detection according to example implementations of the present disclosure.

FIG. 3 depicts a timing diagram 300 of an example method for presence detection according to example implementations of the present disclosure. For instance, timing diagram 300 can include first timeline 310, representing a first asset, and second timeline 320, representing a second asset. Timing diagram 300 can begin at challenge message transmit time 312. A challenge message can be transmitted from a first asset to a second asset at challenge message transmit time 312. For instance, the first asset can transmit the challenge message when it is desirable for the first asset and/or the second asset to be verified. In some implementations, the challenge message transmit time 312 can occur arbitrarily (e.g., randomly), periodically (e.g., in set intervals), and/or in response to one or more stimuli (e.g., a request message, such as a message from another asset). Challenge message transmit time 312 can mark any suitable point before and/or at which the challenge message has entirely left the first asset. For example, the challenge message transmit time 312 can correspond to a point at and/or before a first bit of the challenge message is transmitted by the first asset. As another example, the challenge message transmit time 312 can correspond to a point at and/or before a last bit of the challenge message has been transmitted by the first asset. As another example, the challenge message transmit time 312 can correspond to a point at which a median bit of the challenge message is transmitted by the first asset.

Timing diagram 300 can include challenge message transmit duration 315. Challenge message transmit duration can span from challenge message transmit time 312 to challenge message receive time 322. During challenge message transmit duration 315, the challenge message can be transmitted from a first asset to a second asset. For example, the challenge message can be transmitted bitwise (e.g., one or more bits at a time, such as in one or more packets) and/or in any other suitable manner. Challenge message transmit duration 315 can correspond to a period of time from start to finish of the transmission. The challenge message can be transmitted according to any suitable transmission protocol, such as wired and/or wireless transmission protocols. For instance, in some implementations, the challenge message can be transmitted by a low energy wireless protocol, such as, for instance, Bluetooth Low Energy (BLE).

The challenge message can be received by an asset (e.g., a second asset) at challenge message receive time 322. Challenge message receive time 322 can mark any suitable point before at which and/or after (e.g., closely after) the challenge message has entirely been received and/or recorded by the second asset. For example, the challenge message receive time 322 can correspond to a point at which a first bit of the challenge message is received by the second asset. As another example, the challenge message receive time 322 can correspond to a point at which a last bit of the challenge message has been received by the second asset. As another example, the challenge message receive time 322 can correspond to a point at which a median bit of the challenge message is received by the second asset.

Timing diagram 300 can include computing time 323 and/or wait time 324. For instance, wait time 324 (e.g., alone and/or in combination with computing time 323) can represent a time duration that is specified by a challenge response delay included in the challenge message for which the second asset should wait before responding to the challenge message. For example, the challenge response delay can specify a time duration to wait after some known time, such as, for example, the challenge message transmit time and/or the challenge message receive time. For example, in some implementations, the challenge response delay can specify a time duration to wait after the challenge message receive time (e.g., the combination of computing time 323 and/or wait time 324). As another example, the challenge response delay can specify a time duration to wait after a computing process (e.g., decrypting process) is complete. For instance, decrypting the challenge message can take an amount of time represented by computing time 323. Wait time 324 can correspond directly to the challenge response delay and/or the remaining time specified by the challenge response delay after the computing process is performed over computing time 323.

As used herein, "waiting" refers to allowing a time duration to lapse before a response is transmitted from a waiting asset (e.g., the second asset), and does not necessarily correspond to an idle state of the waiting asset. For example, the waiting asset may perform other computations (e.g., decrypting) related to and/or unrelated to the presence detection process during and/or after waiting. In some implementations, however, the waiting asset may be in an idle state while waiting.

A reply message can be transmitted from a second asset to a first asset at reply message transmit time 326. The reply message transmit time 326 can be based at least in part on a challenge response delay included in the challenge message. For example, the reply message transmit time 326 can be or can include a combination (e.g., addition) of the challenge message receive time 322 and/or the challenge response delay. For instance, the challenge response delay can specify a time for the second asset to wait after receiving the challenge message (e.g., at challenge message receive time 322), and/or the reply message transmit time 326 can be established to conform to the challenge response delay.

Timing diagram 300 can include reply message transmit duration 325. Reply message transmit duration can span from reply message transmit time 326 to reply message receive time 314. During reply message transmit duration 325, the reply message can be transmitted from a second asset to a first asset. For example, the reply message can be transmitted bitwise (e.g., one or more bits at a time, such as in one or more packets) and/or in any other suitable manner. Reply message transmit duration 325 can correspond to a period of time from start to finish of the transmission. The reply message can be transmitted according to any suitable transmission protocol, such as wired and/or wireless transmission protocols. For instance, in some implementations, the reply message can be transmitted by a low energy wireless protocol, such as, for instance, Bluetooth Low Energy (BLE).

The reply message can be received by an asset (e.g., the first asset) at reply message receive time 314. For instance, after the reply message is received by the first asset at reply message receive time 314, the first asset can verify the second asset. For example, the second asset can be verified as a member of a secure network, granted access to secure resources, etc. The second asset can be verified based on a comparison of the reply message receive time 314 to a valid reply message receive time span 330. For example, if the reply message receive time 314 is not within the valid reply message receive time span 330, the second asset may not be verified. If the reply message receive time 314 is within the valid reply message receive time span 330, the second asset can be verified. Additional verification steps can be performed, such as if the reply message receive time 314 is within the valid reply message receive time span 330. For instance, in some implementations, a unique identifier included in the reply message can be verified as being identical to and/or otherwise predictably derived from a unique identifier included in the challenge message.

The valid reply message receive time span 330 can be based at least in part on the challenge message transmit time and the challenge response delay. For example, in some implementations, the valid reply message receive time span 330 can be a combination (e.g., addition) of the challenge message transmit time and the challenge response delay. Additionally, the valid reply message receive time span 330 can accommodate travel time for distances within a distance span.

For instance, in some implementations, the valid reply message receive time span 330 can include an earliest valid reply message receive time 332 and/or a latest valid reply message receive time 334. In some implementations, the earliest valid reply message receive time 332 and/or the latest valid reply message receive time 334 can be established based at least in part on signal travel time and/or minimum valid distance and/or maximum valid distance between the first asset and the second asset. Additionally and/or alternatively, in some implementations, the valid reply message receive time span 330 can be established based on a window duration, such as an arbitrary window duration.

In some implementations, the earliest valid reply message receive time 332 can be established based at least in part on signal travel time (e.g., two-way signal travel time) for a minimum valid distance between the first asset and the second asset. For instance, in some implementations, the earliest valid reply message receive time 332 can be established as a combination of the challenge message transmit time and the challenge response delay (e.g., if there is no travel time between the first and second asset). For example, in some implementations, a minimum valid distance can be about zero meters. Additionally and/or alternatively, in some implementations, the latest valid reply message receive time 334 can be established based at least in part on signal travel time (e.g., two-way signal travel time) for a maximum valid distance between the first asset and the second asset. For instance, the latest valid reply message receive time 334 can be established as a combination of the challenge message transmit time, the challenge response delay, and two-way signal travel time for the maximum valid distance (e.g., if a speed at which the signal travels is known, such as at the speed of light). For example, in some implementations, a maximum valid distance can be greater than about zero meters, such as about 100 meters, such as about 150 meters, such as about 300 meters. Increasing the maximum valid distance can allow for verification of assets separated by greater distances, but may provide a larger window for adversarial communications.

Additionally and/or alternatively, in some implementations, the valid reply message receive time span 330 can be established based on a window duration, such as an arbitrary window duration. For example, the maximum valid reply message receive time can be established as a combination of the minimum valid reply message receive time (e.g., as a combination of the challenge message transmit time and challenge response delay) and the window duration. For example, in some implementations, the window duration can be about one microsecond.

As can be appreciated by one of skill in the art, time spans based on signal travel time at the speed of light can, in some cases, require precise time keeping and/or computations, such as on the order of only a few microseconds. Enforcing time frames at such magnitudes (e.g., on the order of less than 10 microseconds) can prevent adversarial parties from successfully infiltrating secure systems while reliably allowing trusted assets to be successfully verified. As one example, having strict valid time spans can reduce a likelihood of a successful replay attack. For instance, the valid reply message receive time span 330 can be selected to be small enough that a replay attack cannot successfully transmit a captured (e.g., and potentially otherwise valid) signal from a first location to a second location quickly enough, as the relay would likely take on the order of milliseconds. As another example, having a response delay that is known only to proper assets (e.g., by encryption) can prevent adversarial parties from responding in the valid reply message receive time 314 window. For example, secure encryption can prevent adversarial parties from learning the response delay. Additionally, even if the encryption were broken by an adversarial party, this process can take longer than is allowed by the first asset. For example, adversarial decryption can take longer than is allowed by the response delay.

Additionally, the valid reply message receive time span 330 can include additional tolerances (e.g., increase in latest valid time and/or decrease in earliest valid time) to accommodate imprecisions in the communication. For example, the additional tolerances can account for clock shifts at either or both of the first asset and/or the second asset. As another example, the additional tolerances can account for clock precision (e.g., rounding). As another example, the additional tolerances can account for time desynchronization (e.g., minor desynchronization, such as on the order of a few clock cycles) between the first asset and the second asset.

A length of challenge message transmit duration 315 and/or reply message transmit duration 325 can be affected based at least in part on a distance between a first asset and a second asset. For instance, the messages can travel at a known signal travel speed, such as, for example, at or nearly at the speed of light, such that the length of the durations 315, 325 can be directly correlated to distance based on a known and/or constant signal travel speed. Thus, for instance, it can be possible to validate messages received at an asset by verifying that the messages are transmitted and/or received within a time span based on a desired minimum and/or maximum valid distance between the assets.

Figure 4:
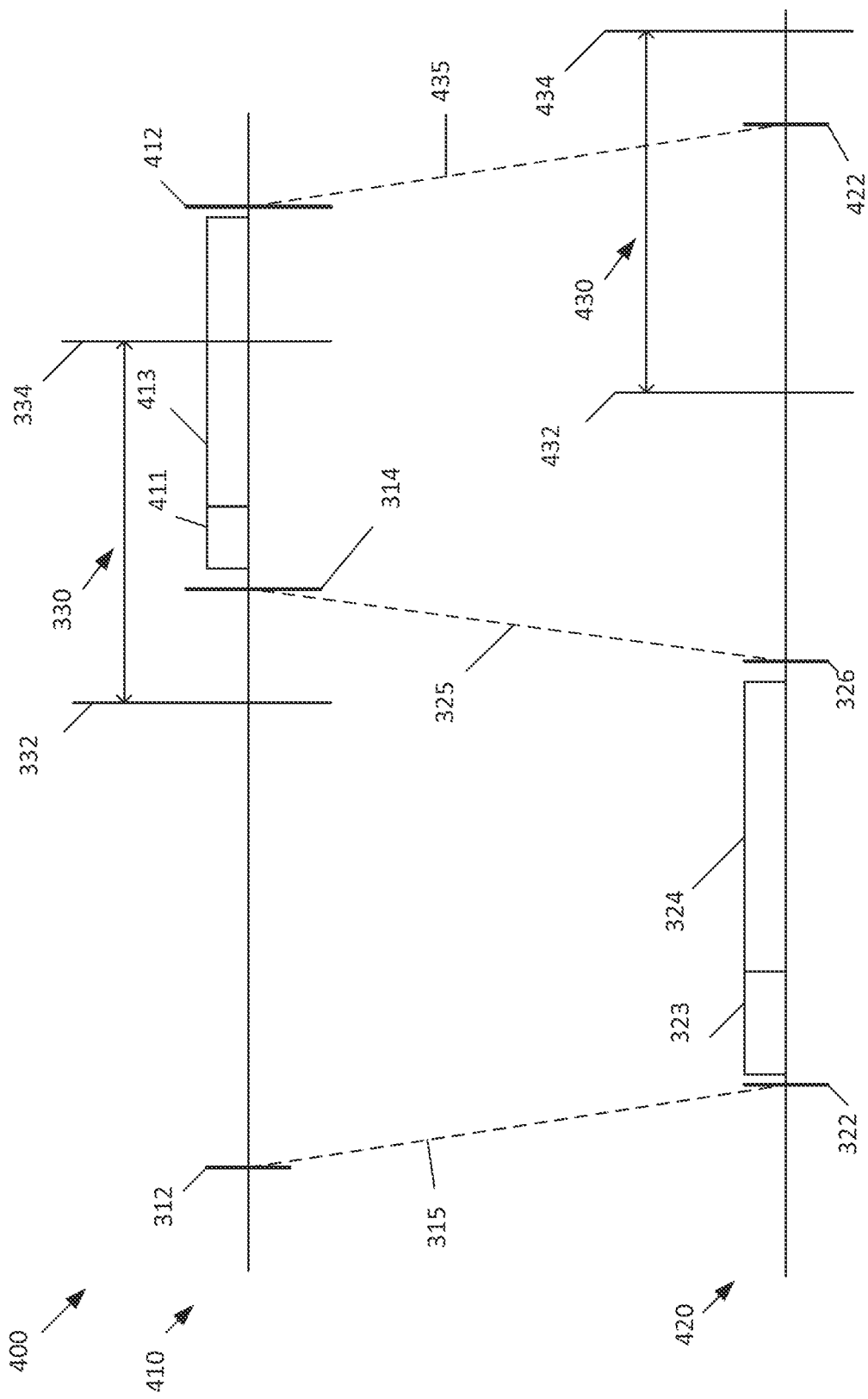
FIG. 4 depicts a timing diagram of an example method for presence detection according to example implementations of the present disclosure.

FIG. 4 depicts a timing diagram of an example method for presence detection according to example implementations of the present disclosure. Timing diagram 400 can include components discussed with reference to timing diagram 300 of FIG. 3, such as, for instance, challenge message transmit time 312, challenge message receive time 322, etc. Additionally, timing diagram 400 can include timings relating to steps directed to verifying a first asset with the second asset after the second asset is verified with the first asset, as described above with regard to FIG. 3. For instance, timing diagram can include first timeline 410 directed to a first asset and second timeline 420 directed to a second asset.

Timing diagram 400 can include computing time 411 and/or wait time 413. For instance, wait time 413 (e.g., alone and/or in combination with computing time 411) can represent a time duration that is specified by a reply response delay included in the reply message for which the second asset should wait before responding to the reply message. For example, the reply response delay can specify a time duration to wait after some known time, such as, for example, the reply message transmit time and/or the reply message receive time. For example, in some implementations, the reply response delay can specify a time duration to wait after the reply message receive time (e.g., the combination of computing time 411 and/or wait time 413). As another example, the reply response delay can specify a time duration to wait after a computing process (e.g., decrypting process) is complete. For instance, decrypting the reply message can take an amount of time represented by computing time 411. Wait time 413 can correspond directly to the reply response delay and/or the remaining time specified by the reply response delay after the computing process is performed over computing time 411.

As used herein, "waiting" refers to allowing a time duration to lapse before a response is transmitted from a waiting asset (e.g., the first asset), and does not necessarily correspond to an idle state of the waiting asset. For example, the waiting asset may perform other computations (e.g., decrypting) related to and/or unrelated to the presence detection process during and/or after waiting. In some implementations, however, the waiting asset may be in an idle state while waiting.

A confirmation message can be transmitted from a first asset to a second asset at confirmation message transmit time 412. The confirmation message transmit time 412 can be based at least in part on a reply response delay included in the reply message. For example, the confirmation message transmit time 412 can be or can include a combination (e.g., addition) of the reply message receive time 314 and/or the reply response delay. For instance, the reply response delay can specify a time for the first asset to wait after receiving the reply message (e.g., at reply message receive time 314), and/or the confirmation message transmit time 412 can be established to conform to the reply response delay.

Timing diagram 400 can include confirmation message transmit duration 435. Confirmation message transmit duration can span from confirmation message transmit time 412 to confirmation message receive time 422. During confirmation message transmit duration 435, the confirmation message can be transmitted from a first asset to a second asset. For example, the confirmation message can be transmitted bitwise (e.g., one or more bits at a time, such as in one or more packets) and/or in any other suitable manner. Confirmation message transmit duration 435 can correspond to a period of time from start to finish of the transmission. The confirmation message can be transmitted according to any suitable transmission protocol, such as wired and/or wireless transmission protocols. For instance, in some implementations, the confirmation message can be transmitted by a low energy wireless protocol, such as, for instance, Bluetooth Low Energy (BLE).

The confirmation message can be received by an asset (e.g., the second asset) at confirmation message receive time 422. For instance, after the confirmation message is received by the second asset at confirmation message receive time 422, the second asset can verify the first asset. For example, the first asset can be verified as a member of a secure network, granted access to secure resources, etc. The first asset can be verified based on a comparison of the confirmation message receive time 422 to a valid confirmation message receive time span 430. For example, if the confirmation message receive time 422 is not within the valid confirmation message receive time span 430, the second asset may not be verified. If the confirmation message receive time 422 is within the valid confirmation message receive time span 430, the second asset can be verified. Additional verification steps can be performed, such as if the confirmation message receive time 422 is within the valid confirmation message receive time span 430. For instance, in some implementations, a unique identifier included in the confirmation message can be verified as being identical to and/or otherwise predictably derived from a unique identifier included in the reply message.

The valid confirmation message receive time span 430 can be based at least in part on the reply message transmit time and the reply response delay. For example, in some implementations, the valid confirmation message receive time span 430 can be a combination (e.g., addition) of the reply message transmit time and the reply response delay. Additionally, the valid confirmation message receive time span 430 can accommodate travel time for distances within a distance span.

For instance, in some implementations, the valid confirmation message receive time span 430 can include an earliest valid confirmation message receive time 432 and/or a latest valid confirmation message receive time 434. In some implementations, the earliest valid confirmation message receive time 432 and/or the latest valid confirmation message receive time 434 can be established based at least in part on signal travel time and/or a minimum valid distance and/or maximum valid distance between the first asset and the second asset. Additionally and/or alternatively, in some implementations, the valid confirmation message receive time span 430 can be established based on a window duration, such as an arbitrary window duration.

In some implementations, the earliest valid confirmation message receive time 432 can be established based at least in part on signal travel time (e.g., two-way signal travel time) for a minimum valid distance between the first asset and the second asset. For instance, in some implementations, the earliest valid confirmation message receive time 432 can be established as a combination of the reply message transmit time and the reply response delay (e.g., if there is no travel time between the first and second asset). For example, in some implementations, a minimum valid distance can be about zero meters. Additionally and/or alternatively, in some implementations, the latest valid confirmation message receive time 434 can be established based at least in part on signal travel time (e.g., two-way signal travel time) for a maximum valid distance between the first asset and the second asset. For instance, the latest valid confirmation message receive time 434 can be established as a combination of the reply message transmit time, the reply response delay, and two-way signal travel time for the maximum valid distance (e.g., if the speed at which the signal travels is known, such as at the speed of light). For example, in some implementations, a maximum valid distance can be greater than about zero meters, such as about 100 meters, such as about 150 meters, such as about 300 meters. Increasing the maximum valid distance can allow for verification of assets separated by greater distances, but may provide a larger window for adversarial communications.

Additionally and/or alternatively, in some implementations, the valid confirmation message receive time span 430 can be established based on a window duration, such as an arbitrary window duration. For example, the maximum valid confirmation message receive time can be established as a combination of the minimum valid confirmation message receive time (e.g., as a combination of the reply message transmit time and reply response delay) and the window duration. For example, in some implementations, the window duration can be about one microsecond.

As can be appreciated by one of skill in the art, time spans based on signal travel time at the speed of light can, in some cases, require precise time keeping and/or computations, such as on the order of only a few microseconds. Enforcing time frames at such magnitudes (e.g., on the order of less than 10 microseconds) can prevent adversarial parties from successfully infiltrating secure systems while reliably allowing trusted assets to be successfully verified. As one example, having strict valid time spans can reduce a likelihood of a successful replay attack. For instance, the valid confirmation message receive time span 430 can be selected to be small enough that a replay attack cannot successfully transmit a captured (e.g., and potentially otherwise valid) signal from a first location to a second location quickly enough, as the relay would likely take on the order of milliseconds. As another example, having a response delay that is known only to proper assets (e.g., by encryption) can prevent adversarial parties from responding in the valid confirmation message receive time span 430. For example, secure encryption can prevent adversarial parties from learning the response delay. Additionally, even if the encryption were broken by an adversarial party, this process can take longer than is allowed by the first asset. For example, adversarial decryption can take longer than is allowed by the response delay.

Additionally, the valid confirmation message receive time span 430 can include additional tolerances (e.g., increase in latest valid time and/or decrease in earliest valid time) to accommodate imprecisions in the communication. For example, the additional tolerances can account for clock shifts at either or both of the first asset and/or the second asset. As another example, the additional tolerances can account for clock precision (e.g., rounding). As another example, the additional tolerances can account for time desynchronization (e.g., minor desynchronization, such as on the order of a few clock cycles) between the first asset and the second asset.

A length of confirmation message transmit duration 435 can be affected based at least in part on a distance between a first asset and a second asset. For instance, a signal travel speed at which the messages travel at (e.g., at or nearly at the speed of light) can be known such that the length of the duration 435 can be directly correlated to distance based on a known and/or constant signal travel speed. Thus, for instance, it can be possible to validate messages received at an asset by verifying that the messages are transmitted and/or received within a time span based on a desired minimum and/or maximum valid distance between the assets.

Figure 5:
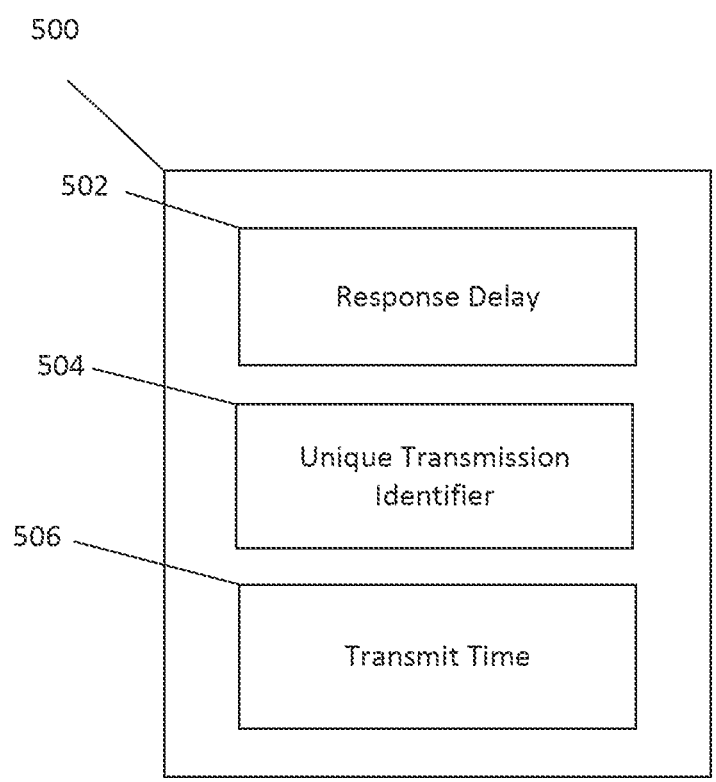
FIG. 5 depicts a block diagram of an example message according to example implementations of the present disclosure.

FIG. 5 depicts a block diagram of an example message 500 according to example implementations of the present disclosure. For instance, the message 500 can be or can include a challenge message, a reply message, a confirmation message, and/or any other suitable message in accordance with the present disclosure. The message 500 can be transmitted from a first asset to a second asset and/or a second asset to a first asset. The message 500 can be or can include a response delay 502. As an example, the challenge message can include a challenge response delay. For instance, the challenge response delay can be specified by the first asset. As another example, in some implementations, the reply message can include a reply response delay. The reply response delay can be uniquely specified by the second asset and/or be the same as the challenge response delay. A response delay 502 can be indicative of a time duration that a receiving asset must wait before replying to the message 500. A response delay 502 can encode the time duration in computer-readable data in any suitable format according to example aspects of the present disclosure. For example, the response delay 502 can be or can include a computer-readable data entry, such as a plurality of bits. The response delay 502 can be arbitrarily determined, such as randomly determined (e.g., at startup, for each transmission, etc.). Additionally and/or alternatively, the response delay 502 can be fixed.

Additionally and/or alternatively, the message 500 can be or can include an identifier 504, such as a unique transmission identifier 504. The identifier 504 can provide a unique data entry that can be useful in differentiating the message 500 from other similar messages, such as, for example, earlier and/or subsequent messages. Including an identifier 504 can be useful in preventing attacks, such as, for example, replay attacks. Additionally and/or alternatively, the identifier 504 can be useful in categorizing and/or cataloging the messages 500. For instance, the identifier 504 can be used in hash functions, as initializations, etc. In some implementations, the identifier 504 can be cryptographically signed.

In some implementations, the identifier 504 can be or can include a nonce. For instance, the nonce can be or can include an arbitrary number that can be used once in a communication. As an example, the nonce can be or can include a random number and/or pseudo-random number, such as a number from an authentication protocol.

As another example, in some implementations, the identifier 504 can be or can include a counter, such as a transmission counter. For instance, the transmission counter can increment and/or decrement with each subsequent transmission, such as each challenge message.

Additionally and/or alternatively, the message 500 can be or can include a transmit time 506. For example, the challenge message can be or can include a challenge message transmit time. As another example, the reply message can be or can include a reply message transmit time. As another example, the confirmation message can be or can include a confirmation message transmit time. For instance, a transmit time 506 can be or can include a time, such as a time according to a clock of the first asset and/or second asset, from which the message 500 is transmitted. The transmit time 506 can be encoded in any suitable computer-readable format, such as a computer-readable format useful for time values. As another example, the transmit time 506 can be or can include a count of clock cycles.

Some or all messages 500 from the assets, such as, for instance, the challenge message, reply message, confirmation message, and/or any other suitable messages, can be transmitted according to any suitable transmission protocol, such as wired and/or wireless transmission protocols. For instance, in some implementations, the messages 500 can be transmitted by a low energy wireless protocol, such as, for instance, Bluetooth Low Energy (BLE).

Some or all messages from the assets, such as, for instance, the challenge message, reply message, confirmation message, and/or any other suitable messages, can be encrypted. For instance, encrypting the messages 500 can prevent unintended recipients of the messages 500 from interpreting data present in the challenge message, such as the response delay 502. The challenge message can be encrypted by any suitable encryption protocol, such as, for example, public-key cryptography. As one example, each of the first asset and the second asset can have an associated public key and/or private key. The public key(s) can be readily distributed while maintaining secrecy of the cryptography protocol as long as the private key(s) are known only to their respective asset. Messages 500 that are transmitted by the assets (e.g., challenge message, reply message, etc.) can be encrypted with the public key and/or the private key of the transmitting asset and/or receiving asset. For example, messages to be received by a receiving asset (e.g., one of the first or second assets) can be encrypted with the receiving asset's public key such that the messages 500 can only be decrypted by the receiving asset in possession of its private key. Additionally and/or alternatively, the messages 500 can be encrypted using the private key and decrypted with the respective public key.

Figure 6:
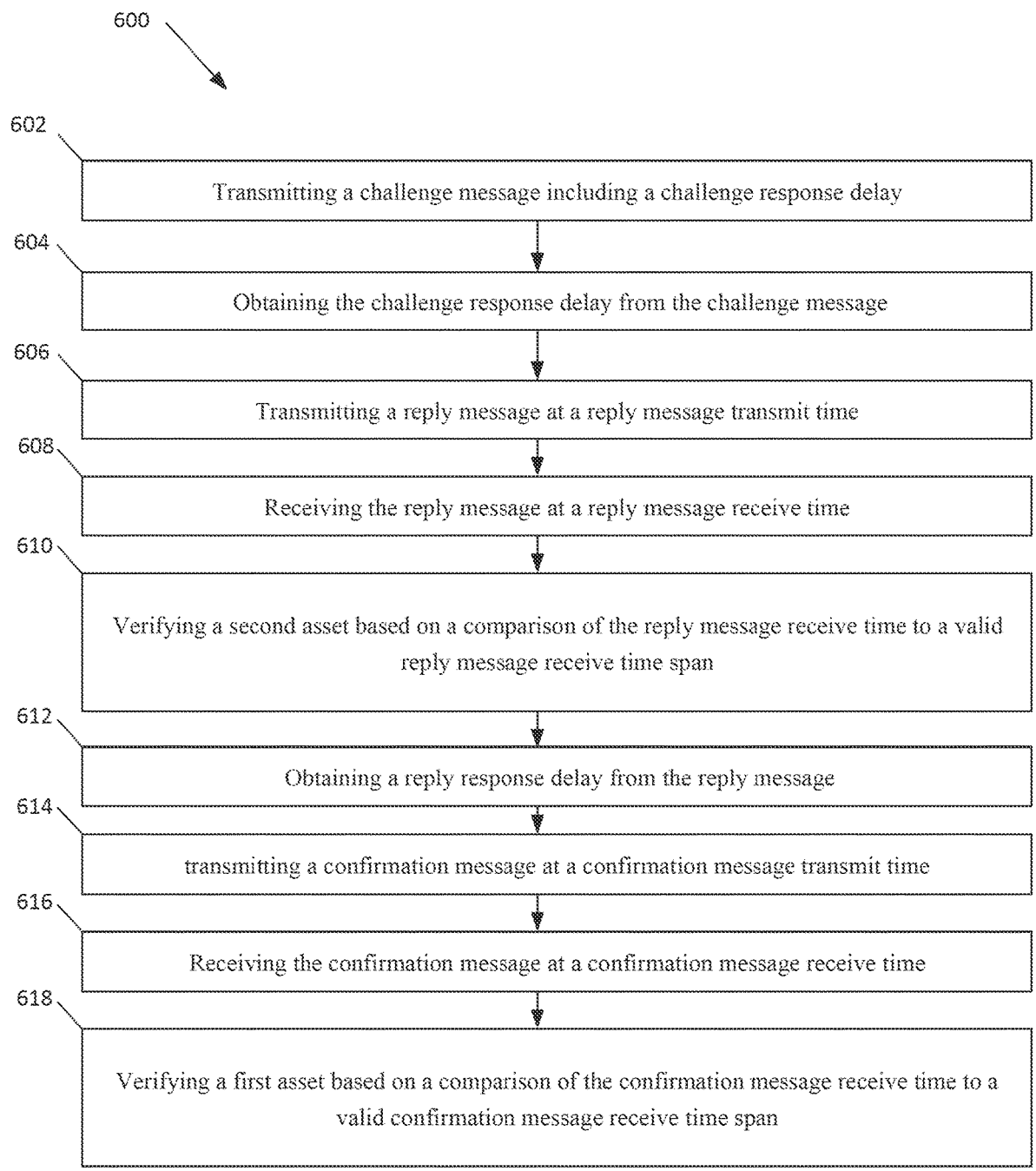
FIG. 6 depicts a flow chart diagram of an example method for presence detection according to example implementations of the present disclosure.

FIG. 6 depicts a flow chart diagram of an example computer-implemented method 600 for presence detection according to example implementations of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

The computer-implemented method 600, such as a portion of the computer-implemented method 600, can be implemented at a first asset and/or a second asset. The first asset and/or the second asset can perform at least a portion of the computer-implemented method 600 for presence detection. For instance, in some implementations, the first asset can verify the second asset. As another example, in some implementations, the second asset can verify the first asset. In some implementations, both the first asset and the second asset can verify each other.

The computer-implemented method 600 can include, at 602, transmitting (e.g., by a first asset) a challenge message. The challenge message can be transmitted from a first asset to a second asset. For instance, the first asset can transmit the challenge message when it is desirable for the first asset and/or the second asset to be verified. In some implementations, the challenge message can be transmitted arbitrarily (e.g., randomly), periodically (e.g., in set intervals), and/or in response to one or more stimuli (e.g., a request message, such as a message from another asset). The challenge message can include a challenge response delay. The challenge response delay can be indicative of a time duration that the second asset must wait before replying to the challenge message. Additionally and/or alternatively, the challenge response delay can include an identifier, such as a nonce. Additionally and/or alternatively, the challenge message can include a challenge message transmit time corresponding to the point in time at which the challenge message is partially and/or completely transmitted.

The challenge message can be received by the second asset. The challenge message can be received by the second asset at a challenge message receive time. For instance, the challenge message receive time can be a time (e.g., as measured by a clock of the second asset) at which the challenge message is partially and/or completely captured (e.g., by a signal receptor, antenna, etc.), recorded (e.g., in a memory device, etc.), and/or otherwise suitably present at the second asset.

The computer-implemented method 600 can include, at 604, obtaining (e.g., by a second asset) the challenge response delay from the challenge message. As one example, the challenge message can be encrypted. Additionally and/or alternatively, obtaining the challenge response delay can include decrypting the challenge message. Additionally and/or alternatively, obtaining the challenge response delay can include extracting the challenge response delay from a decrypted challenge message. For instance, decrypting the challenge message can include transforming an encrypted challenge message that is uninterpretable in a conventional computer format (e.g., hexadecimal, floating point, ASCII, etc.) into a decrypted challenge message that can be interpreted by the second asset.

In some implementations, the second asset can determine that the challenge message receive time is within a valid travel time interval from the challenge message transmit time. The second asset can determine that the challenge message receive time is within a valid travel time interval from the challenge message time prior to transmitting a reply message. For example, if the challenge message receive time is within the valid travel time interval, the process can proceed normally (e.g., including transmitting a reply message). For instance, in response to determining that the challenge message receive time is within a valid travel time interval from the challenge message transmit time, the method 600 can include transmitting the reply message. If, however, the challenge message receive time is not within the valid time travel interval (e.g., if the receive time precedes the transmit time and/or if the challenge message arrives too late), the process can be aborted. For instance, in response to determining that the challenge message receive time is not within a valid travel time interval from the challenge message transmit time, the process can include aborting transmitting the reply message.

For instance, in some implementations, the challenge message can include the challenge message transmit time. The second asset can compare the challenge message receive time to the challenge message transmit time (e.g., by subtracting the challenge message receive time from the challenge message transmit time) to determine if the challenge message receive time is within the valid travel time interval from the challenge message transmit time. The valid travel time interval can be established based at least in part on travel time, such as one-directional travel time from the first asset to the second asset, and/or a maximum valid distance between the first asset and the second asset. For example, the valid travel time interval can include a subtractive combination of the challenge message receive time and a travel time corresponding to how long it would take a signal to travel from the first asset to the second asset at a maximum valid distance (e.g., if a speed at which the signal travels is known, such as at the speed of light). As another example, the valid travel time interval can be an arbitrary interval, such as a microsecond, such as less than a microsecond. In some implementations, tolerances based on, for example, clock drift, desynchronization, etc. can be included in the valid travel time interval.

The challenge response delay can specify a time duration that the second asset is to wait before responding (e.g., transmitting a response to) the challenge message. For instance, the challenge response delay can specify the time duration in such a manner that only trusted systems, such as the second asset, can understand (e.g., by encryption). Thus, an adversarial party can be prevented from knowing when to respond to the challenge message. Thus, reply messages that do not conform to the challenge response delay can have a high likelihood of sourcing from an adversarial party and/or may be discarded, blocked, and/or otherwise ignored by the first asset.

As one example, the challenge message can be encrypted by public-key cryptography. For instance, in some implementations, a public key of the first asset can be used to encrypt (e.g., by the first asset) the challenge message. Additionally and/or alternatively, in some implementations, a private key of the first asset can be used to encrypt (e.g., by the first asset) the challenge message. For instance, in some implementations, a public key of the first asset can be used to decrypt (e.g., by the second asset) the challenge message. Additionally and/or alternatively, in some implementations, a private key of the first asset can be used to decrypt (e.g., by the second asset) the challenge message.

The second asset can wait for a time duration that is specified by the challenge response delay. For example, the challenge response delay can specify a time duration to wait after some known time, such as, for example, the challenge message transmit time and/or the challenge message receive time. For example, in some implementations, the challenge response delay can specify a time duration to wait after the challenge message receive time. As another example, the challenge response delay can specify a time duration to wait after a decrypting process is complete (e.g., if the decrypting process has a known compute time).

The time duration can be specified in any suitable format in accordance with example aspects of the present disclosure. As one example, the time duration can be or can include a number of seconds, such as a fractional number of seconds (e.g., milliseconds, microseconds, etc.). As another example, the time duration can be or can include a number of clock cycles.

As used herein, "waiting" refers to allowing a time duration to lapse before a response is transmitted from a waiting asset (e.g., the second asset), and does not necessarily correspond to an idle state of the waiting asset. For example, the waiting asset may perform other computations (e.g., decrypting) related to and/or unrelated to the computer-implemented method 600 during and/or after waiting. In some implementations, however, the waiting asset may be in an idle state while waiting.

For instance, the computer-implemented method 600 can include, at 606, transmitting (e.g., by the second asset) a reply message at a reply message transmit time. The reply message transmit time can be based at least in part on the challenge response delay. For example, the reply message transmit time can be or can include a combination (e.g., addition) of the challenge message receive time and/or the challenge response delay. For instance, the challenge response delay can specify a time for the second asset to wait after receiving the challenge message, and/or the reply message transmit time can be established to conform to the challenge response delay.

In some implementations, the reply message can be or can include an identifier, such as a nonce. For example, in some implementations, the reply message can include the identifier that is transmitted in the challenge message. For instance, in some implementations the first asset can compare the identifier transmitted in the reply message to the identifier transmitted in the challenge message. If the identifiers match, it can be indicative that the second asset was able to understand (e.g., decrypt) the (e.g., encrypted) challenge message, which can be indicative of trustworthiness of the first asset and/or second asset. Additionally and/or alternatively, the reply message can be or can include the reply message transmit time.

In some implementations, the reply message can be encrypted. As one example, the reply message can be encrypted by public-key cryptography. For instance, in some implementations, a public key of the second asset can be used to encrypt (e.g., by the second asset) the reply message. Additionally and/or alternatively, in some implementations, a private key of the second asset can be used to encrypt (e.g., by the second asset) the reply message. For instance, in some implementations, a public key of the second asset can be used to decrypt (e.g., by the first asset) the reply message. Additionally and/or alternatively, in some implementations, a private key of the second asset can be used to decrypt (e.g., by the first asset) the reply message.

The computer-implemented method 600 can include, at 608, receiving (e.g., by the first asset) the reply message. The reply message can be received at the first asset at a reply message receive time. For instance, the reply message receive time can be a time (e.g., as measured by a clock of the first asset) at which the reply message is partially and/or completely captured (e.g., by a signal receptor, antenna, etc.), recorded (e.g., in a memory device, etc.), and/or otherwise suitably present at the first asset.

The computer-implemented method 600 can include, at 610, verifying (e.g., by the first asset) the second asset. For example, the second asset can be verified as a member of a secure network, granted access to secure resources, etc. The second asset can be verified based on a comparison of the reply message receive time to a valid reply message receive time span. For example, if the reply message receive time is not within the valid reply message receive time span, the second asset may not be verified. If the reply message receive time is within the valid reply message receive time span, the second asset can be verified. Additional verification steps can be performed, such as if the reply message receive time is within the valid reply message receive time span. For instance, in some implementations, a unique identifier included in the reply message can be verified as being identical to and/or otherwise predictably derived from a unique identifier included in the challenge message.

The valid reply message receive time span can be based at least in part on the challenge message transmit time and the challenge response delay. For example, in some implementations, the valid reply message receive time span can be a combination (e.g., addition) of the challenge message transmit time and the challenge response delay. Additionally, the valid reply message receive time span can accommodate travel time for distances within a distance span.

For instance, in some implementations, the valid reply message receive time span can include an earliest valid reply message receive time and/or a latest valid reply message receive time. In some implementations, the earliest valid reply message receive time and/or the latest valid reply message receive time can be established based at least in part on signal travel time and/or a minimum valid distance and/or maximum valid distance between the first asset and the second asset. Additionally and/or alternatively, in some implementations, the valid reply message receive time span can be established based on a window duration, such as an arbitrary window duration.

In some implementations, the earliest valid reply message receive time can be established based at least in part on signal travel time (e.g., two-way signal travel time) for a minimum valid distance between the first asset and the second asset. For instance, in some implementations, the earliest valid reply message receive time can be established as a combination of the challenge message transmit time and the challenge response delay (e.g., if there is no travel time between the first and second asset). For example, in some implementations, a minimum valid distance can be about zero meters. Additionally and/or alternatively, in some implementations, the latest valid reply message receive time can be established based at least in part on signal travel time (e.g., two-way signal travel time) for a maximum valid distance between the first asset and the second asset. For instance, the latest valid reply message receive time can be established as a combination of the challenge message transmit time, the challenge response delay, and two-way signal travel time for the maximum valid distance (e.g., if a speed at which the signal travels is known, such as at the speed of light). For example, in some implementations, a maximum valid distance can be greater than about zero meters, such as about 100 meters, such as about 150 meters, such as about 300 meters. Increasing the maximum valid distance can allow for verification of assets separated by greater distances, but may provide a larger window for adversarial communications.

Additionally and/or alternatively, in some implementations, the valid reply message receive time span can be established based on a window duration, such as an arbitrary window duration. For example, the maximum valid reply message receive time can be established as a combination of the minimum valid reply message receive time (e.g., as a combination of the challenge message transmit time and challenge response delay) and the window duration. For example, in some implementations, the window duration can be about one microsecond.

As can be appreciated by one of skill in the art, time spans based on signal travel time at the speed of light can, in some cases, require precise time keeping and/or computations, such as on the order of only a few microseconds. Enforcing time frames at such magnitudes (e.g., on the order of less than 10 microseconds) can prevent adversarial parties from successfully infiltrating secure systems while reliably allowing trusted assets to be successfully verified. As one example, having strict valid time spans can reduce a likelihood of a successful replay attack. For instance, the valid reply message receive time span can be selected to be small enough that a replay attack cannot successfully transmit a captured (e.g., and potentially otherwise valid) signal from a first location to a second location quickly enough, as the relay would likely take on the order of milliseconds. As another example, having a response delay that is known only to proper assets (e.g., by encryption) can prevent adversarial parties from responding in the valid reply message receive time window. For example, secure encryption can prevent adversarial parties from learning the response delay. Additionally, even if the encryption were broken by an adversarial party, this process can take longer than is allowed by the first asset. For example, adversarial decryption can take longer than is allowed by the response delay.

Additionally, the valid reply message receive time span can include additional tolerances (e.g., increase in latest valid time and/or decrease in earliest valid time) to accommodate imprecisions in the communication. For example, the additional tolerances can account for clock shifts at either or both of the first asset and/or the second asset. As another example, the additional tolerances can account for clock precision (e.g., rounding). As another example, the additional tolerances can account for time desynchronization (e.g., minor desynchronization, such as on the order of a few clock cycles) between the first asset and the second asset.

The computer-implemented method 600 can additionally include steps directed to verifying the first asset with the second asset after the second asset is verified with the first asset, as described above. For instance, the reply message from the second asset can additionally include a reply response delay. The computer-implemented method 600 can include, at 612, obtaining (e.g., by the first asset) the reply response delay from the reply message. As one example, the reply message can be encrypted. Additionally and/or alternatively, obtaining the reply response delay can include decrypting the reply message. Additionally and/or alternatively, obtaining the reply response delay can include extracting the reply response delay from a decrypted reply message. For instance, decrypting the reply message can include transforming an encrypted reply message that is uninterpretable in a conventional computer format (e.g., hexadecimal, floating point, ASCII, etc.) into a decrypted reply message that can be interpreted by the second asset.

Similar to the challenge response delay, the reply response delay can specify a time duration that the first asset is to wait before responding (e.g., transmitting a response to) the reply message. The reply response delay can specify a time duration that the first asset is to wait before responding (e.g., transmitting a response) to the reply message. For instance, the reply response delay can specify the time duration in such a manner that only trusted systems, such as the first asset, can understand (e.g., by encryption). Thus, an adversarial party can be prevented from knowing when to respond to the reply message. Thus, confirmation messages that do not conform to the reply response delay can have a high likelihood of sourcing from an adversarial party and/or may be discarded, blocked, and/or otherwise ignored by the second asset.

The first asset can wait for a time duration that is specified by the reply response delay. For example, the reply response delay can specify a time duration to wait after some known time, such as, for example, the reply message transmit time and/or the reply message receive time. For example, in some implementations, the reply response delay can specify a time duration to wait after the reply message receive time. As another example, the reply response delay can specify a time duration to wait after a decrypting process is complete (e.g., if the decrypting process has a known compute time).

The time duration can be specified in any suitable format in accordance with example aspects of the present disclosure. As one example, the time duration can be or can include a number of seconds, such as a fractional number of seconds (e.g., milliseconds, microseconds, etc.). As another example, the time duration can be or can include a number of clock cycles.

As used herein, "waiting" refers to allowing a time duration to lapse before a response is transmitted from a waiting asset (e.g., the first asset), and does not necessarily correspond to an idle state of the waiting asset. For example, the waiting asset may perform other computations (e.g., decrypting) related to and/or unrelated to the computer-implemented method 600 during and/or after waiting. In some implementations, however, the waiting asset may be in an idle state while waiting.

For instance, the computer-implemented method 600 can include, at 614, transmitting (e.g., by the first asset) a confirmation message at a confirmation message transmit time. The confirmation message transmit time can be based at least in part on the reply response delay. For example, the confirmation message transmit time can be or can include a combination (e.g., addition) of the reply message receive time and/or the reply response delay. For instance, the reply response delay can specify a time for the first asset to wait after receiving the reply message, and/or the confirmation message transmit time can be established to conform to the reply response delay.

In some implementations, the confirmation message can be or can include an identifier, such as a nonce. For example, in some implementations, the confirmation message can include the identifier that is transmitted in the reply message and/or the challenge message. For instance, in some implementations, the second asset can compare the identifier transmitted in the confirmation message to the identifier transmitted in the reply message. If the identifiers match, it can be indicative that the first asset was able to understand (e.g., decrypt) the (e.g., encrypted) reply message, which can be indicative of trustworthiness of the first asset and/or second asset. Additionally and/or alternatively, the confirmation message can be or can include the confirmation message transmit time.

In some implementations, the confirmation message can be encrypted. As one example, the confirmation message can be encrypted by public-key cryptography. For instance, in some implementations, a public key of the first asset can be used to encrypt (e.g., by the first asset) the confirmation message. Additionally and/or alternatively, in some implementations, a private key of the first asset can be used to encrypt (e.g., by the first asset) the confirmation message. For instance, in some implementations, a public key of the first asset can be used to decrypt (e.g., by the second asset) the confirmation message. Additionally and/or alternatively, in some implementations, a private key of the first asset can be used to decrypt (e.g., by the second asset) the confirmation message.

The computer-implemented method 600 can include, at 616, receiving (e.g., by the second asset) the confirmation message. The confirmation message can be received at the second asset at a confirmation message receive time. For instance, the confirmation message receive time can be a time (e.g., as measured by a clock of the second asset) at which the confirmation message is partially and/or completely captured (e.g., by a signal receptor, antenna, etc.), recorded (e.g., in a memory device, etc.), and/or otherwise suitably present at the second asset.

The computer-implemented method 600 can include, at 618, verifying (e.g., by the second asset) the first asset. For example, the first asset can be verified as a member of a secure network, granted access to secure resources, etc. The first asset can be verified based on a comparison of the confirmation message receive time to a valid confirmation message receive time span. For example, if the confirmation message receive time is not within the valid confirmation message receive time span, the first asset may not be verified. If the confirmation message receive time is within the valid confirmation message receive time span, the first asset can be verified. Additional verification steps can be performed, such as if the confirmation message receive time is within the valid confirmation message receive time span. For instance, in some implementations, a unique identifier included in the confirmation message can be verified as being identical to and/or otherwise predictably derived from a unique identifier included in the reply message.

The valid confirmation message receive time span can be based at least in part on the reply message transmit time and the reply response delay. For example, in some implementations, the valid confirmation message receive time span can be a combination (e.g., addition) of the reply message transmit time and the reply response delay. Additionally, the valid confirmation message receive time span can accommodate travel time for distances within a distance span.

For instance, in some implementations, the valid confirmation message receive time span can include an earliest valid confirmation message receive time and/or a latest valid confirmation message receive time. In some implementations, the earliest valid confirmation message receive time and/or the latest valid confirmation message receive time can be established based at least in part on signal travel time and/or a minimum valid distance and/or maximum valid distance between the second asset and the first asset. Additionally and/or alternatively, in some implementations, the valid confirmation message receive time span can be established based on a window duration, such as an arbitrary window duration.

In some implementations, the earliest valid confirmation message receive time can be established based at least in part on signal travel time (e.g., two-way signal travel time) for a minimum valid distance between the second asset and the first asset. For instance, in some implementations, the earliest valid confirmation message receive time can be established as a combination of the reply message transmit time and the reply response delay (e.g., if there is no travel time between the second and first asset). For example, in some implementations, a minimum valid distance can be about zero meters. Additionally and/or alternatively, in some implementations, the latest valid confirmation message receive time can be established based at least in part on signal travel time (e.g., two-way signal travel time) for a maximum valid distance between the second asset and the first asset. For instance, the latest valid confirmation message receive time can be established as a combination of the reply message transmit time, the reply response delay, and two-way signal travel time for the maximum valid distance (e.g., if a speed at which the signal travels is known, such as at the speed of light). For example, in some implementations, a maximum valid distance can be greater than about zero meters, such as about 100 meters, such as about 150 meters, such as about 300 meters. Increasing the maximum valid distance can allow for verification of assets separated by greater distances, but may provide a larger window for adversarial communications.

Additionally and/or alternatively, in some implementations, the valid confirmation message receive time span can be established based on a window duration, such as an arbitrary window duration. For example, the maximum valid confirmation message receive time can be established as a combination of the minimum valid confirmation message receive time (e.g., as a combination of the reply message transmit time and reply response delay) and the window duration. For example, in some implementations, the window duration can be about one microsecond.

Some or all messages from the assets, such as, for instance, the challenge message, reply message, confirmation message, and/or any other suitable messages can be or can include a response delay. As an example, the challenge message can include a challenge response delay. For instance, the challenge response delay can be specified by the first asset. As another example, in some implementations, the reply message can include a reply response delay. The reply response delay can be uniquely specified by the second asset and/or be the same as the challenge response delay. A response delay can be indicative of a time duration that a receiving asset must wait before replying to the message. A response delay can encode the time duration in computer-readable data in any suitable format according to example aspects of the present disclosure. For example, the response delay can be or can include a computer-readable data entry, such as a plurality of bits. The response delay can be arbitrarily determined, such as randomly determined (e.g., at startup, for each transmission, etc.). Additionally and/or alternatively, the response delay can be fixed.

Additionally and/or alternatively, some or all messages from the assets, such as, for instance, the challenge message, reply message, confirmation message, and/or any other suitable messages can be or can include an identifier, such as a unique transmission identifier. The identifier can provide a unique data entry that can be useful in differentiating the message from other similar messages, such as, for example, earlier and/or subsequent messages. Including an identifier can be useful in preventing attacks, such as, for example, replay attacks. Additionally and/or alternatively, the identifier can be useful in categorizing and/or cataloging the messages. For instance, the identifier can be used in hash functions, as initializations, etc. In some implementations, the identifier can be cryptographically signed.

In some implementations, the identifier can be or can include a nonce. For instance, the nonce can be or can include an arbitrary number that can be used once in a communication. As an example, the nonce can be or can include a random number and/or pseudo-random number, such as a number from an authentication protocol.

As another example, in some implementations, the identifier can be or can include a counter, such as a transmission counter. For instance, the transmission counter can increment and/or decrement with each subsequent transmission, such as each challenge message.

Additionally and/or alternatively, some or all messages from the assets, such as, for instance, the challenge message, reply message, confirmation message, and/or any other suitable messages can be or can include a transmit time. For example, the challenge message can be or can include a challenge message transmit time. As another example, the reply message can be or can include a reply message transmit time. As another example, the confirmation message can be or can include a confirmation message transmit time. For instance, a transmit time can be or can include a time, such as a time according to a clock of the first asset and/or second asset, from which the message is transmitted. The transmit time can be encoded in any suitable computer-readable format, such as a computer-readable format useful for time values. As another example, the transmit time can be or can include a count of clock cycles.

Some or all messages from the assets, such as, for instance, the challenge message, reply message, confirmation message, and/or any other suitable messages, can be transmitted according to any suitable transmission protocol, such as wired and/or wireless transmission protocols. For instance, in some implementations, the messages can be transmitted by a low energy wireless protocol, such as, for instance, Bluetooth Low Energy (BLE).

Some or all messages from the assets, such as, for instance, the challenge message, reply message, confirmation message, and/or any other suitable messages, can be encrypted. For instance, encrypting the messages can prevent unintended recipients of the messages from interpreting data present in the challenge message, such as the response delay. The challenge message can be encrypted by any suitable encryption protocol, such as, for example, public-key cryptography. As one example, each of the first asset and the second asset can have an associated public key and/or private key. The public key(s) can be readily distributed while maintaining secrecy of the cryptography protocol as long as the private key(s) are known only to their respective asset. Messages transmitted by the assets (e.g., challenge message, reply message, etc.) can be encrypted with the public key and/or the private key of the transmitting asset and/or receiving asset. For example, messages to be received by a receiving asset (e.g., one of the first or second assets) can be encrypted with the receiving asset's public key such that the messages can only be decrypted by the receiving asset in possession of its private key. Additionally and/or alternatively, the messages can be encrypted using the private key and decrypted with the respective public key.

Although example aspects of the present disclosure are discussed herein with regard to a first asset and a second asset, it should be understood by one of ordinary skill in the art that any suitable number of assets, such as three or more assets, can be utilized in accordance with example aspects of the present disclosure. For instance, verifying an asset can require individual and/or collective verification from two or more trusted assets. For example, the computer-implemented method 600 as described herein can be performed by a plurality of trusted assets and/or the asset can be verified based on some agreement between the plurality of assets (e.g., majority agreement, consensus, fractional and/or percentage agreement, etc.).

In some implementations, an additional verification step can be performed prior to transmitting the challenge message. For example, in some cases, it can be desirable for the first asset to be silent (e.g., not transmitting) unless expected to be in a secure location. This can be useful, for instance, to prevent advertising even a presence of the first asset.

Figure 7:
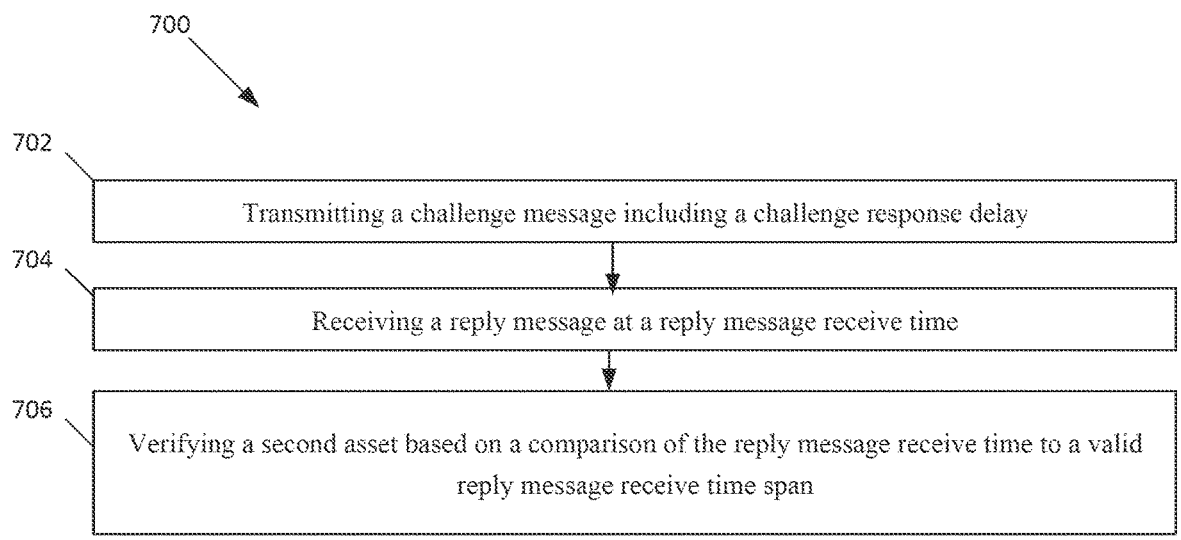
FIG. 7 depicts a flow chart diagram of an example method for presence detection according to example implementations of the present disclosure.

FIG. 7 depicts a flow chart diagram of an example computer-implemented method 700 for presence detection according to example implementations of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

The computer-implemented method 700 can be implemented at a first asset. The first asset can be in communication with a second asset. The first asset and/or the second asset can perform at least a portion of the computer-implemented method 700 for presence detection. For instance, in some implementations, the first asset can verify the second asset. As another example, in some implementations, the second asset can verify the first asset. In some implementations, both the first asset and the second asset can verify each other.

The computer-implemented method 700 can include, at 702, transmitting a challenge message. The challenge message can be transmitted from a first asset to a second asset. For instance, the first asset can transmit the challenge message when it is desirable for the first asset and/or the second asset to be verified. In some implementations, the challenge message can be transmitted arbitrarily (e.g., randomly), periodically (e.g., in set intervals), and/or in response to one or more stimuli (e.g., a request message, such as a message from another asset). The challenge message can include a challenge response delay. The challenge response delay can be indicative of a time duration that the second asset must wait before replying to the challenge message. Additionally and/or alternatively, the challenge response delay can include an identifier, such as a nonce. Additionally and/or alternatively, the challenge message can include a challenge message transmit time corresponding to the point in time at which the challenge message is partially and/or completely transmitted.

The computer-implemented method 700 can include, at 704, receiving (e.g., by the first asset) a reply message. The reply message can be received at the first asset at a reply message receive time. For instance, the reply message receive time can be a time (e.g., as measured by a clock of the first asset) at which the reply message is partially and/or completely captured (e.g., by a signal receptor, antenna, etc.), recorded (e.g., in a memory device, etc.), and/or otherwise suitably present at the first asset.

The computer-implemented method 700 can include, at 706, verifying (e.g., by the first asset) the second asset. For example, the second asset can be verified as a member of a secure network, granted access to secure resources, etc. The second asset can be verified based on a comparison of the reply message receive time to a valid reply message receive time span. For example, if the reply message receive time is not within the valid reply message receive time span, the second asset may not be verified. If the reply message receive time is within the valid reply message receive time span, the second asset can be verified. Additional verification steps can be performed, such as if the reply message receive time is within the valid reply message receive time span. For instance, in some implementations, a unique identifier included in the reply message can be verified as being identical to and/or otherwise predictably derived from a unique identifier included in the challenge message.

The valid reply message receive time span can be based at least in part on the challenge message transmit time and the challenge response delay. For example, in some implementations, the valid reply message receive time span can be a combination (e.g., addition) of the challenge message transmit time and the challenge response delay. Additionally, the valid reply message receive time span can accommodate travel time for distances within a distance span.

For instance, in some implementations, the valid reply message receive time span can include an earliest valid reply message receive time and/or a latest valid reply message receive time. In some implementations, the earliest valid reply message receive time and/or the latest valid reply message receive time can be established based at least in part on signal travel time and/or a minimum valid distance and/or maximum valid distance between the first asset and the second asset. Additionally and/or alternatively, in some implementations, the valid reply message receive time span can be established based on a window duration, such as an arbitrary window duration.

In some implementations, the earliest valid reply message receive time can be established based at least in part on signal travel time (e.g., two-way signal travel time) for a minimum valid distance between the first asset and the second asset. For instance, in some implementations, the earliest valid reply message receive time can be established as a combination of the challenge message transmit time and the challenge response delay (e.g., if there is no travel time between the first and second asset). For example, in some implementations, a minimum valid distance can be about zero meters. Additionally and/or alternatively, in some implementations, the latest valid reply message receive time can be established based at least in part on signal travel time (e.g., two-way signal travel time) for a maximum valid distance between the first asset and the second asset. For instance, the latest valid reply message receive time can be established as a combination of the challenge message transmit time, the challenge response delay, and two-way signal travel time for the maximum valid distance (e.g., if a speed at which the signal travels is known, such as at the speed of light). For example, in some implementations, a maximum valid distance can be greater than about zero meters, such as about 100 meters, such as about 150 meters, such as about 300 meters. Increasing the maximum valid distance can allow for verification of assets separated by greater distances, but may provide a larger window for adversarial communications.

Additionally and/or alternatively, in some implementations, the valid reply message receive time span can be established based on a window duration, such as an arbitrary window duration. For example, the maximum valid reply message receive time can be established as a combination of the minimum valid reply message receive time (e.g., as a combination of the challenge message transmit time and challenge response delay) and the window duration. For example, in some implementations, the window duration can be about one microsecond.

Figure 8:
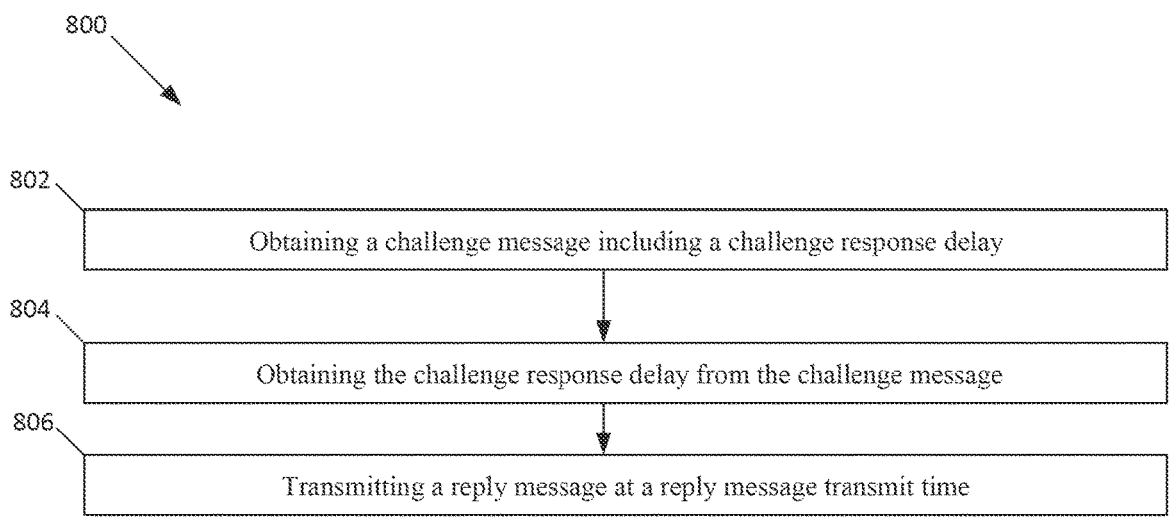
FIG. 8 depicts a flow chart diagram of an example method for presence detection according to example implementations of the present disclosure.

FIG. 8 depicts a flow chart diagram of an example computer-implemented method 800 for presence detection according to example implementations of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

The computer-implemented method 800 can be implemented at a second asset. The first asset can be in communication with a first asset. The first asset and/or the second asset can perform at least a portion of the computer-implemented method 800 for presence detection. For instance, in some implementations, the first asset can verify the second asset. As another example, in some implementations, the second asset can verify the first asset. In some implementations, both the first asset and the second asset can verify each other.

The computer-implemented method 800 can include, at 802, obtaining (e.g., by the second asset) a challenge message. For instance, the challenge message can be received by the second asset and transmitted by a first asset. The challenge message can be received by the second asset at a challenge message receive time. For instance, the challenge message receive time can be a time (e.g., as measured by a clock of the second asset) at which the challenge message is partially and/or completely captured (e.g., by a signal receptor, antenna, etc.), recorded (e.g., in a memory device, etc.), and/or otherwise suitably present at the second asset. The challenge message can include a challenge response delay. Additionally and/or alternatively, the challenge message can include an identifier. Additionally and/or alternatively, the challenge message can include a challenge message transmit time.

The computer-implemented method 800 can include, at 804 obtaining the challenge response delay from the challenge message. As one example, the challenge message can be encrypted. Additionally and/or alternatively, obtaining the challenge response delay can include decrypting the challenge message. Additionally and/or alternatively, obtaining the challenge response delay can include extracting the challenge response delay from a decrypted challenge message. For instance, decrypting the challenge message can include transforming an encrypted challenge message that is uninterpretable in a conventional computer format (e.g., hexadecimal, floating point, ASCII, etc.) into a decrypted challenge message that can be interpreted by the second asset.

In some implementations, the second asset can determine that the challenge message receive time is within a valid travel time interval from the challenge message transmit time. The second asset can determine that the challenge message receive time is within a valid travel time interval from the challenge message time prior to transmitting a reply message. For example, if the challenge message receive time is within the valid travel time interval, the process can proceed normally (e.g., including transmitting a reply message). For instance, in response to determining that the challenge message receive time is within a valid travel time interval from the challenge message transmit time, the process can include transmitting the reply message. If, however, the challenge message receive time is not within the valid time travel interval (e.g., if the receive time precedes the transmit time and/or if the challenge message arrives too late), the process can be aborted. For instance, in response to determining that the challenge message receive time is not within a valid travel time interval from the challenge message transmit time, the process can include aborting transmitting the reply message.

For instance, in some implementations, the challenge message can include the challenge message transmit time. The second asset can compare the challenge message receive time to the challenge message transmit time (e.g., by subtracting the challenge message receive time from the challenge message transmit time) to determine if the challenge message receive time is within the valid travel time interval from the challenge message transmit time. The valid travel time interval can be established based at least in part on travel time, such as one-directional travel time from the first asset to the second asset, and/or a maximum valid distance between the first asset and the second asset. For example, the valid travel time interval can include a subtractive combination of the challenge message receive time and a travel time corresponding to how long it would take a signal to travel from the first asset to the second asset at a maximum valid distance (e.g., if a speed at which the signal travels is known, such as at the speed of light). As another example, the valid travel time interval can be an arbitrary interval, such as a microsecond, such as less than a microsecond. In some implementations, tolerances based on, for example, clock drift, desynchronization, etc. can be included in the valid travel time interval.

The challenge response delay can specify a time duration that the second asset is to wait before responding (e.g., transmitting a response) to the challenge message. For instance, the challenge response delay can specify the time duration in such a manner that only trusted systems, such as the second asset, can understand (e.g., by encryption). Thus, an adversarial party can be prevented from knowing when to respond to the challenge message. Thus, reply messages that do not conform to the challenge response delay can have a high likelihood of sourcing from an adversarial party and/or may be discarded, blocked, and/or otherwise ignored by the first asset.

As one example, the challenge message can be encrypted by public-key cryptography. For instance, in some implementations, a public key of the first asset can be used to encrypt (e.g., by the first asset) the challenge message. Additionally and/or alternatively, in some implementations, a private key of the first asset can be used to encrypt (e.g., by the first asset) the challenge message. For instance, in some implementations, a public key of the first asset can be used to decrypt (e.g., by the second asset) the challenge message. Additionally and/or alternatively, in some implementations, a private key of the first asset can be used to decrypt (e.g., by the second asset) the challenge message.

The second asset can wait for a time duration that is specified by the challenge response delay. For example, the challenge response delay can specify a time duration to wait after some known time, such as, for example, the challenge message transmit time and/or the challenge message receive time. For example, in some implementations, the challenge response delay can specify a time duration to wait after the challenge message receive time. As another example, the challenge response delay can specify a time duration to wait after a decrypting process is complete (e.g., if the decrypting process has a known compute time).

The time duration can be specified in any suitable format in accordance with example aspects of the present disclosure. As one example, the time duration can be or can include a number of seconds, such as a fractional number of seconds (e.g., milliseconds, microseconds, etc.). As another example, the time duration can be or can include a number of clock cycles.

As used herein, "waiting" refers to allowing a time duration to lapse before a response is transmitted from a waiting asset (e.g., the second asset), and does not necessarily correspond to an idle state of the waiting asset. For example, the waiting asset may perform other computations (e.g., decrypting) related to and/or unrelated to the computer-implemented method 800 during and/or after waiting. In some implementations, however, the waiting asset may be in an idle state while waiting.

For instance, the computer-implemented method 800 can include, at 806, transmitting (e.g., by the second asset) a reply message at a reply message transmit time. The reply message transmit time can be based at least in part on the challenge response delay. For example, the reply message transmit time can be or can include a combination (e.g., addition) of the challenge message receive time and/or the challenge response delay. For instance, the challenge response delay can specify a time for the second asset to wait after receiving the challenge message, and/or the reply message transmit time can be established to conform to the challenge response delay.

In some implementations, the reply message can be or can include an identifier, such as a nonce. For example, in some implementations, the reply message can include the identifier that is transmitted in the challenge message. For instance, in some implementations the first asset can compare the identifier transmitted in the reply message to the identifier transmitted in the challenge message. If the identifiers match, it can be indicative that the second asset was able to understand (e.g., decrypt) the (e.g., encrypted) challenge message, which can be indicative of trustworthiness of the first asset and/or second asset. Additionally and/or alternatively, the reply message can be or can include the reply message transmit time.

In some implementations, the reply message can be encrypted. As one example, the reply message can be encrypted by public-key cryptography. For instance, in some implementations, a public key of the second asset can be used to encrypt (e.g., by the second asset) the reply message. Additionally and/or alternatively, in some implementations, a private key of the second asset can be used to encrypt (e.g., by the second asset) the reply message. For instance, in some implementations, a public key of the second asset can be used to decrypt (e.g., by the first asset) the reply message. Additionally and/or alternatively, in some implementations, a private key of the second asset can be used to decrypt (e.g., by the first asset) the reply message.

Figure 9:
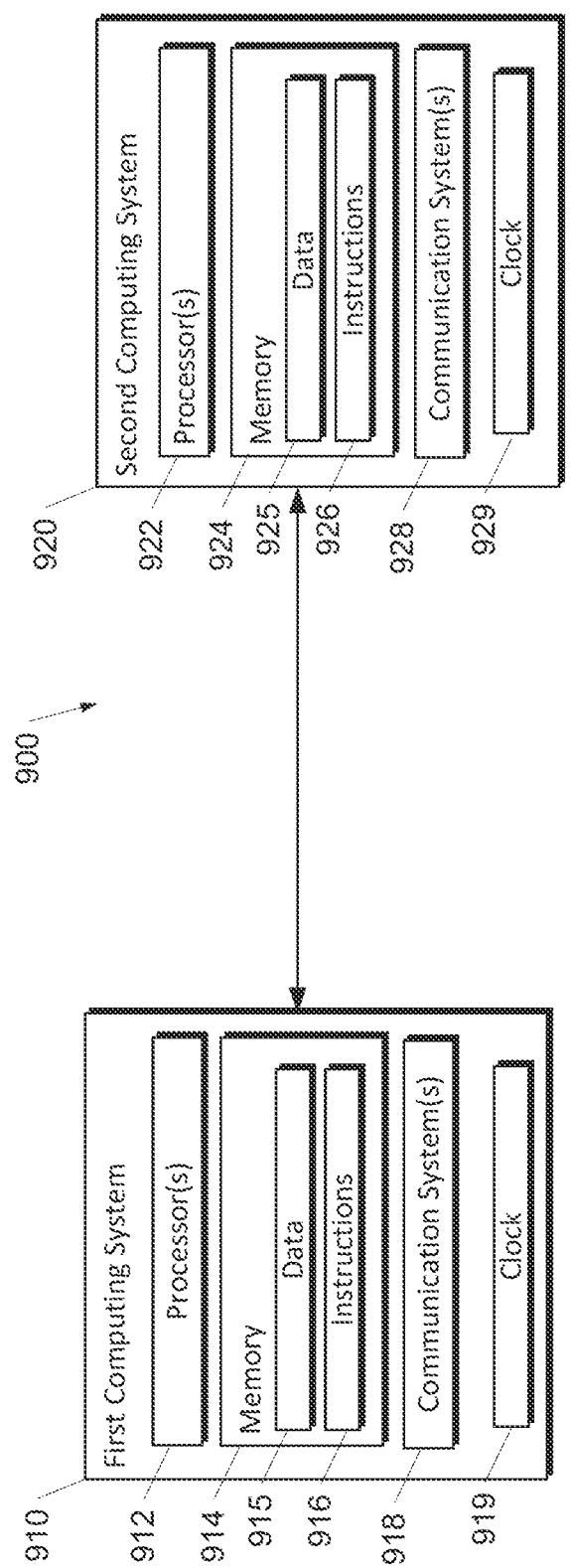
FIG. 9 depicts a block diagram of an example presence detection system according to example implementations of the present disclosure.

FIG. 9 depicts a block diagram of an example presence detection system 900 according to example implementations of the present disclosure. Presence detection system 900 can include first computing system 910 and/or second computing system 920. For instance, first computing system 910 can be or can include a first asset. Additionally and/or alternatively, second computing system 920 can be or can include a second asset.

The first computing system 910 can be any type of computing device, such as, for example, a personal computing device (e.g., laptop or desktop), a mobile computing device (e.g., smartphone or tablet), a gaming console or controller, a wearable computing device, an embedded computing device, or any other type of computing device. For instance, the first computing system 910 can be or can include one or more computing device(s), such as mobile device(s) such as, for instance, cell phones, mobile phones, smartphones, tablet computers, laptop computers, handheld computers, PDAs, etc. For instance, in some implementations, the first computing system 910 can be or can include a server computing system. Additionally and/or alternatively, in some implementations, the first computing system 910 can be or can include an integrated computing system, such as a dedicated computing system integrated into, for example, a security badge (e.g., employee badge), fob, clothing article, and/or any other suitable clothing, accessory, and/or paraphernalia in accordance with example aspects of the present disclosure. For instance, in some implementations, the first computing system 910 can be included in a security badge.

The first computing system 910 includes one or more processors 912 and a memory 914. The one or more processors 912 can be any suitable processing device (e.g., a processor core, a microprocessor, an ASIC, a FPGA, a controller, a microcontroller, etc.) and can be one processor or a plurality of processors that are operatively connected. The memory 914 can include one or more non-transitory computer-readable storage mediums, such as RAM, ROM, EEPROM, EPROM, flash memory devices, magnetic disks, etc., and combinations thereof. The memory 914 can store data 915 and instructions 916 which are executed by the processors 912 to cause the first computing system 910 to perform operations. For example, the operations can include performing a presence detection process, such as a presence detection process according to computer-implemented methods 600, 700, 800 of FIGS. 6-8 and/or any other suitable presence detection process. The first computing system 910 can include a clock 919 configured to provide a current time, as measured at the first computing system 910. For instance, in some implementations, the clock can be periodically synchronized with one or more other computing systems.

The second computing system 920 can be any type of computing device, such as, for example, a personal computing device (e.g., laptop or desktop), a mobile computing device (e.g., smartphone or tablet), a gaming console or controller, a wearable computing device, an embedded computing device, or any other type of computing device. For instance, the second computing system 920 can be or can include one or more computing device(s), such as mobile device(s) such as, for instance, cell phones, mobile phones, smartphones, tablet computers, laptop computers, handheld computers, PDAs, etc. For instance, in some implementations, the second computing system 920 can be or can include a server computing system. Additionally and/or alternatively, in some implementations, the second computing system 920 can be or can include an integrated computing system, such as a dedicated computing system integrated into, for example, a security badge (e.g., employee badge), fob, clothing article, and/or any other suitable clothing, accessory, and/or paraphernalia in accordance with example aspects of the present disclosure. For instance, in some implementations, the second computing system 920 can be included in a security badge.

The second computing system 920 includes one or more processors 922 and a memory 924. The one or more processors 922 can be any suitable processing device (e.g., a processor core, a microprocessor, an ASIC, a FPGA, a controller, a microcontroller, etc.) and can be one processor or a plurality of processors that are operatively connected. The memory 924 can include one or more non-transitory computer-readable storage mediums, such as RAM, ROM, EEPROM, EPROM, flash memory devices, magnetic disks, etc., and combinations thereof. The memory 924 can store data 925 and instructions 926 which are executed by the processors 922 to cause the second computing system 920 to perform operations. For example, the operations can include performing a presence detection process, such as a presence detection process according to computer-implemented methods 600, 700, 800 of FIGS. 6-8 and/or any other suitable presence detection process. The second computing system 920 can include a clock 929 configured to provide a current time, as measured at the second computing system 920. For instance, in some implementations, the clock can be periodically synchronized with one or more other computing systems.

The first computing system 910 can be in communication with the second computing system 920. For instance, the first computing system 910 can include communication system 918 configured to transmit and/or receive messages associated with at least the second computing system 920. Additionally and/or alternatively, the second computing system 920 can include communication system 928 configured to transmit and/or receive messages associated with at least the first computing system 910. For instance, the first computing system 910 and the second computing system 920 can be in communication using any suitable wired and/or wireless protocol, such as, for example, Bluetooth low-energy (BLE). Additionally and/or alternatively, the computing systems 910, 920 can be in communication over a network, such as the internet (e.g., via Wi-Fi). As one example, the communication systems 918, 928 can transmit and/or receive messages, such as message 500 discussed with reference to FIG. 5.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for verifying identity of an asset, the computer-implemented method comprising:
    transmitting, by a first asset, a challenge message at a challenge message transmit time, the challenge message comprising a challenge response delay;
    receiving, by the first asset, a reply message at a reply message receive time, the reply message transmitted from a second asset that is in receipt of the challenge message, wherein the reply message comprises a reply response delay;
    obtaining, by the first asset, the reply response delay from the reply message;
    transmitting, by the first asset, a confirmation message at a confirmation message transmit time, wherein the confirmation message transmit time is based at least in part on the reply response delay;
    wherein the confirmation is received, by the second asset, at a confirmation message receive time and
    the first asset is verified, by the second asset, based on a comparison of the confirmation message receive time to a valid confirmation message receive time span, the valid confirmation message receive time span based at least in part on the reply message transmit time and the reply response delay; and
    verifying, by the first asset, the second asset based on a comparison of the reply message receive time to a valid reply message receive time span, the valid reply message receive time span based at least in part on the challenge message transmit time and the challenge response delay.

2. The computer-implemented method of claim 1, wherein the challenge message and the reply message are encrypted by public-key cryptography.

3. The computer-implemented method of claim 1, wherein:
    the challenge message is obtained by the second asset at a challenge message receive time;
    the challenge message comprises the challenge message transmit time; and
    the second asset is configured to determine that the challenge message receive time is within a valid travel time interval from the challenge message transmit time prior to transmitting the reply message.

4. The computer-implemented method of claim 3, wherein the second asset is configured to abort transmitting the reply message in response to determining that the challenge message receive time is not within a valid travel time interval from the challenge message transmit time.

5. The computer-implemented method of claim 3, wherein the valid travel time interval is based at least in part on a maximum valid distance between the first asset and the second asset.

6. The computer-implemented method of claim 1, wherein the challenge message and the reply message each comprise an identifier.

7. The computer-implemented method of claim 6, wherein verifying the second asset comprises comparing the identifier of the reply message to the identifier of the challenge message.

8. The computer-implemented method of claim 1, wherein the reply message is transmitted at a reply message transmit time by the second asset, the reply message transmit time based at least in part on the challenge response delay.

9. The computer-implemented method of claim 1, wherein the first asset comprises at least one of a mobile device, a server computing system, or a security badge.

10. The computer-implemented method of claim 1, wherein the second asset comprises at least one of a mobile device, a server computing system, or a security badge.

11. A computing system configured to verify identity of a second computing system, the computing system comprising:
    one or more processors; and
    one or more memory devices storing computer-readable instructions that, when implemented, cause the one or more processors to perform operations, the operations comprising:

transmitting a challenge message at a challenge message transmit time to a second computing system, the challenge message comprising a challenge response delay;

receiving, from the second computing system, a reply message at a reply message receive time, wherein the reply message comprises a reply response delay;

obtaining, by the computing system, the reply response delay from the reply message;

transmitting, by the computing system, a confirmation message at a confirmation message transmit time, wherein the confirmation message transmit time is based at least in part on the reply response delay;

wherein the confirmation is received, by the second computing system, at a confirmation message receive time and the computing system is verified, by the second computing system, based on a comparison of the confirmation message receive time to a valid confirmation message receive time span, the valid confirmation message receive time span based at least in part on the reply message transmit time and the reply response delay; and verifying the second computing system based on a comparison of the reply message receive time to a valid reply message receive time span, the valid reply message receive time span based at least in part on the challenge message transmit time and the challenge response delay.

12. The computing system of claim 11, wherein the challenge message and the reply message are encrypted by public-key cryptography.

13. The computing system of claim 11, wherein the valid reply message receive time span is based at least in part on a maximum valid distance between the computing system and the second computing system.

14. The computing system of claim 11, wherein the challenge message and the reply message each comprise an identifier, and wherein verifying the second computing system comprises comparing the identifier of the reply message to the identifier of the challenge message.

15. The computing system of claim 11, wherein the second computing system comprises at least one of a mobile device or a security badge.

16. A computing system configured to be verified by a second computing system, the computing system comprising:

one or more processors; and one or more memory devices storing computer-readable instructions that, when implemented, cause the one or more processors to perform operations, the operations comprising:

obtaining a challenge message from a second computing system, the challenge message comprising a challenge response delay;

obtaining the challenge response delay from the challenge message;

transmitting a reply message to the second computing system at a reply message transmit time, wherein the reply message transmit time is based at least in part on the challenge response delay, wherein the reply message comprises a reply response delay;

transmitting, by the second computing system, the reply response delay from the reply message;

obtaining, by the second computing system, a confirmation message at a confirmation message transmit time, wherein the confirmation message transmit time is based at least in part on the reply response delay;

receiving, by the second computing system, the confirmation message at a confirmation message receive time; and verifying the computing system is verified, by the second computing system, based on a comparison of the confirmation message receive time to a valid confirmation message receive time span, the valid confirmation message receive time span based at least in part on the reply message transmit time and the reply response delay, wherein the second computing system is verified by the computing system, based on a comparison of the reply message receive time to a valid reply message receive time span, the valid reply message receive time span based at least in part on the challenge message transmit time and the challenge response delay.

17. The computing system of claim 16, wherein the challenge message and the reply message are encrypted by public-key cryptography.

18. The computing system of claim 16, wherein:

the challenge message is obtained a challenge message receive time;

the challenge message comprises a challenge message transmit time; and the operations further comprise:

determining that the challenge message receive time is within a valid travel time interval from the challenge message transmit time prior to transmitting the reply message; and in response to determining that the challenge message receive time is not within a valid travel time interval from the challenge message transmit time, abort transmitting the reply message.

19. The computing system of claim 16, wherein the challenge message and the reply message each comprise an identifier, and wherein the identifier of the reply message is predictably derived from the identifier of the challenge message.

* * * * *